United States Patent
Tabassi et al.

(10) Patent No.: US 8,932,046 B2
(45) Date of Patent: Jan. 13, 2015

(54) EDGE-GATED INJECTION MOLDING APPARATUS

(71) Applicant: Mold-Masters (2007) Limited, Georgetown (CA)

(72) Inventors: Payman Tabassi, Rockwood (CA); Kenneth Jacob, Tunkhannock, PA (US)

(73) Assignee: Mold-Masters (2007) Limited, Georgetown, ON (CA)

( * ) Notice: Subject to any disclaimer, the term of this patent is extended or adjusted under 35 U.S.C. 154(b) by 0 days.

(21) Appl. No.: 13/803,859

(22) Filed: Mar. 14, 2013

(65) Prior Publication Data

US 2013/0243901 A1 Sep. 19, 2013

Related U.S. Application Data

(60) Provisional application No. 61/612,149, filed on Mar. 16, 2012.

(51) Int. Cl.
*B29C 45/27* (2006.01)
*B29C 45/07* (2006.01)

(52) U.S. Cl.
CPC ........... *B29C 45/076* (2013.01); *B29C 45/2735* (2013.01); *B29C 2045/2761* (2013.01);
(Continued)

(58) Field of Classification Search
CPC ............ B29C 45/2708; B29C 45/2725; B29C 45/278; B29C 2045/2708; B29C 2045/2712; B29C 2045/2716; B29C 2045/2761; B29C 2045/2783
USPC .......................................... 425/567, 568, 572
See application file for complete search history.

(56) References Cited

U.S. PATENT DOCUMENTS

| 3,677,682 A | 7/1972 | Putkowski |
| 4,312,630 A | 1/1982 | Travaglini |

(Continued)

FOREIGN PATENT DOCUMENTS

| DE | 202007017136 | 5/2009 |
| DE | 10008722 B4 | 2/2010 |

(Continued)

OTHER PUBLICATIONS

"European Search Report", EP Application No. 13 00 1371.7, Jul. 18, 2013.

(Continued)

*Primary Examiner* — Yogendra Gupta
*Assistant Examiner* — Emmanuel S Luk
(74) *Attorney, Agent, or Firm* — Medler Ferro PLLC

(57) ABSTRACT

An edge-gated injection molding apparatus is disclosed having an injection manifold assembly for distributing a melt stream of moldable material to a plurality of mold cavities aligned on opposing sides of the injection manifold assembly. The injection manifold assembly includes a plurality of melt outlets with each melt outlet being in fluid communication with a respective mold cavity, and a plurality of biasing components disposed along a centerline of the injection manifold assembly. A nozzle seal is disposed between each injection manifold assembly melt outlet and its corresponding mold cavity, with an upstream end of the nozzle seal being slidably disposed against its respective melt outlet. Each biasing component is disposed between a pair of melt outlets and corresponding nozzle seals for biasing the melt outlets and nozzle seals outward from the centerline of the injection manifold assembly toward their respective mold cavities and applying a preload thereto.

20 Claims, 15 Drawing Sheets

(52) U.S. Cl.
CPC ....... *B29C45/278* (2013.01); *B29C 2045/2716* (2013.01); *B29C 2045/2712* (2013.01); *B29C 2045/2783* (2013.01); *B29C 45/2725* (2013.01); *B29C 45/2708* (2013.01); *B29C 2045/2793* (2013.01); *B29C 2045/2798* (2013.01)
USPC ............................. 425/567; 425/568; 425/572

(56) References Cited

U.S. PATENT DOCUMENTS

| | | | |
|---|---|---|---|
| 4,588,367 A | | 5/1986 | Schad |
| 5,141,155 A | | 8/1992 | Jacobsen |
| 5,206,040 A | | 4/1993 | Gellert |
| 5,326,251 A | * | 7/1994 | Gellert ........................... 425/549 |
| 5,591,465 A | * | 1/1997 | Babin ........................... 425/549 |
| 5,980,237 A | * | 11/1999 | Swenson et al. ............... 425/549 |
| 6,007,108 A | * | 12/1999 | Braun ........................ 285/125.1 |
| 7,207,790 B2 | | 4/2007 | Trakas |
| 7,303,384 B2 | | 12/2007 | Schreck |
| RE40,584 E | * | 11/2008 | Babin ........................... 425/549 |
| 7,510,393 B2 | | 3/2009 | Glaesener et al. |
| 7,794,228 B2 | | 9/2010 | Catoen |
| 8,475,158 B2 | * | 7/2013 | Fairy ........................... 425/570 |
| 2003/0091684 A1 | | 5/2003 | Hefner |
| 2008/0131552 A1 | | 6/2008 | Gaillard et al. |
| 2008/0131553 A1 | | 6/2008 | Gaillard et al. |
| 2009/0269430 A1 | | 10/2009 | Catoen |
| 2010/0092602 A1 | | 4/2010 | Gunther et al. |

FOREIGN PATENT DOCUMENTS

| | | |
|---|---|---|
| DE | 102009037343 A1 | 2/2011 |
| EP | 0932488 B1 | 5/2003 |
| EP | 2199055 A1 | 6/2010 |
| EP | 2228193 | 9/2010 |
| EP | 2243613 A1 | 10/2010 |
| EP | 2308664 | 4/2011 |
| EP | 2314438 | 4/2011 |
| EP | 2447007 | 5/2012 |
| JP | 55140537 | 11/1980 |
| WO | WO-2009/124865 | 10/2009 |
| WO | 2012015778 A1 | 2/2012 |
| WO | WO-2012/096831 | 7/2012 |
| WO | WO-2012/115614 | 8/2012 |

OTHER PUBLICATIONS

Goldsberry, Clare. "Hot runner targets deep-draw parts like syringe barrels where quality, gate vestiges are critical", PlasticsToday.com, Nov. 11, 2011.

Husky Injection Molding Systems, "Ultra SideGate Technology Flyer", www.husky.ca, Oct. 1, 2011.

* cited by examiner

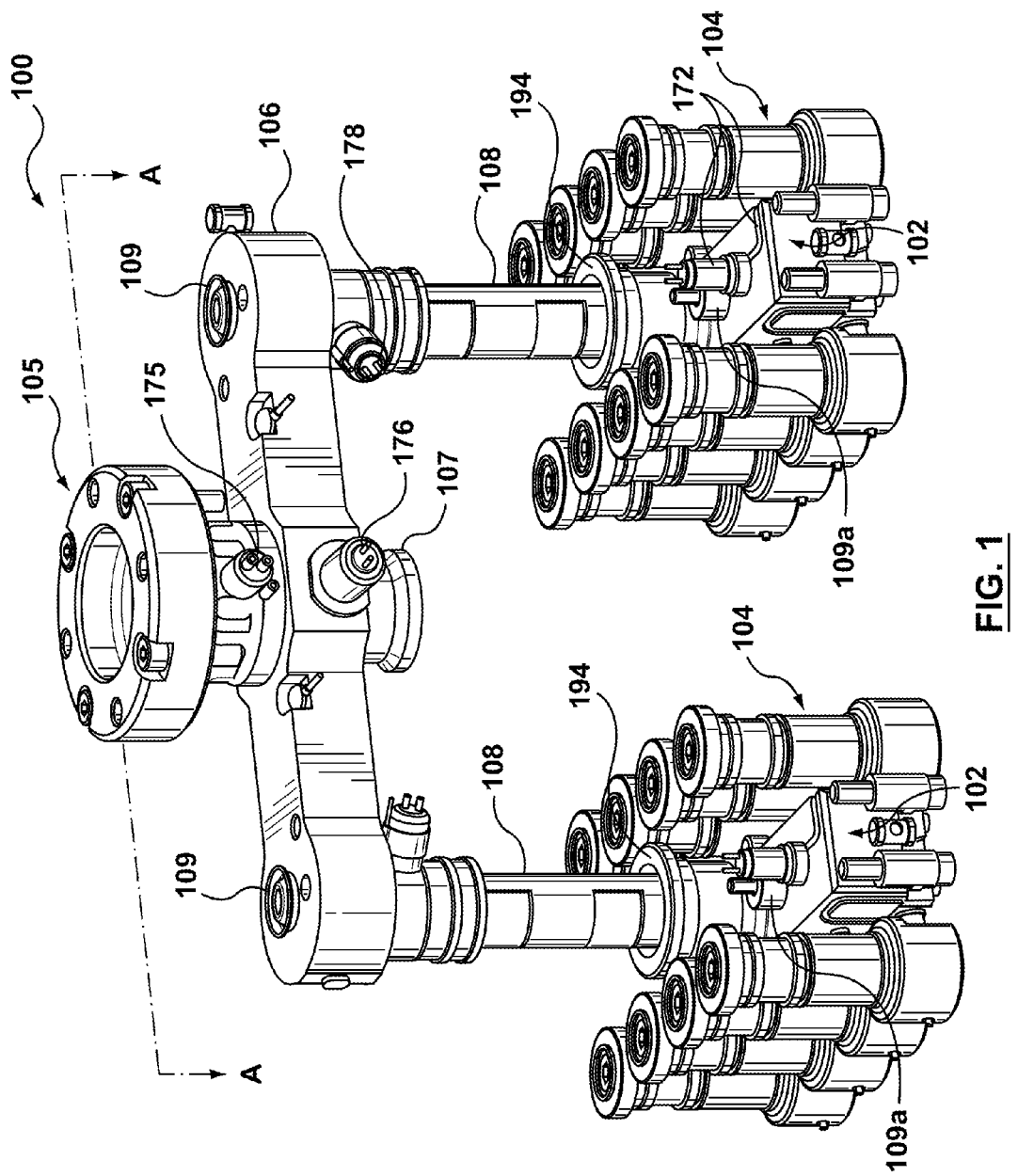

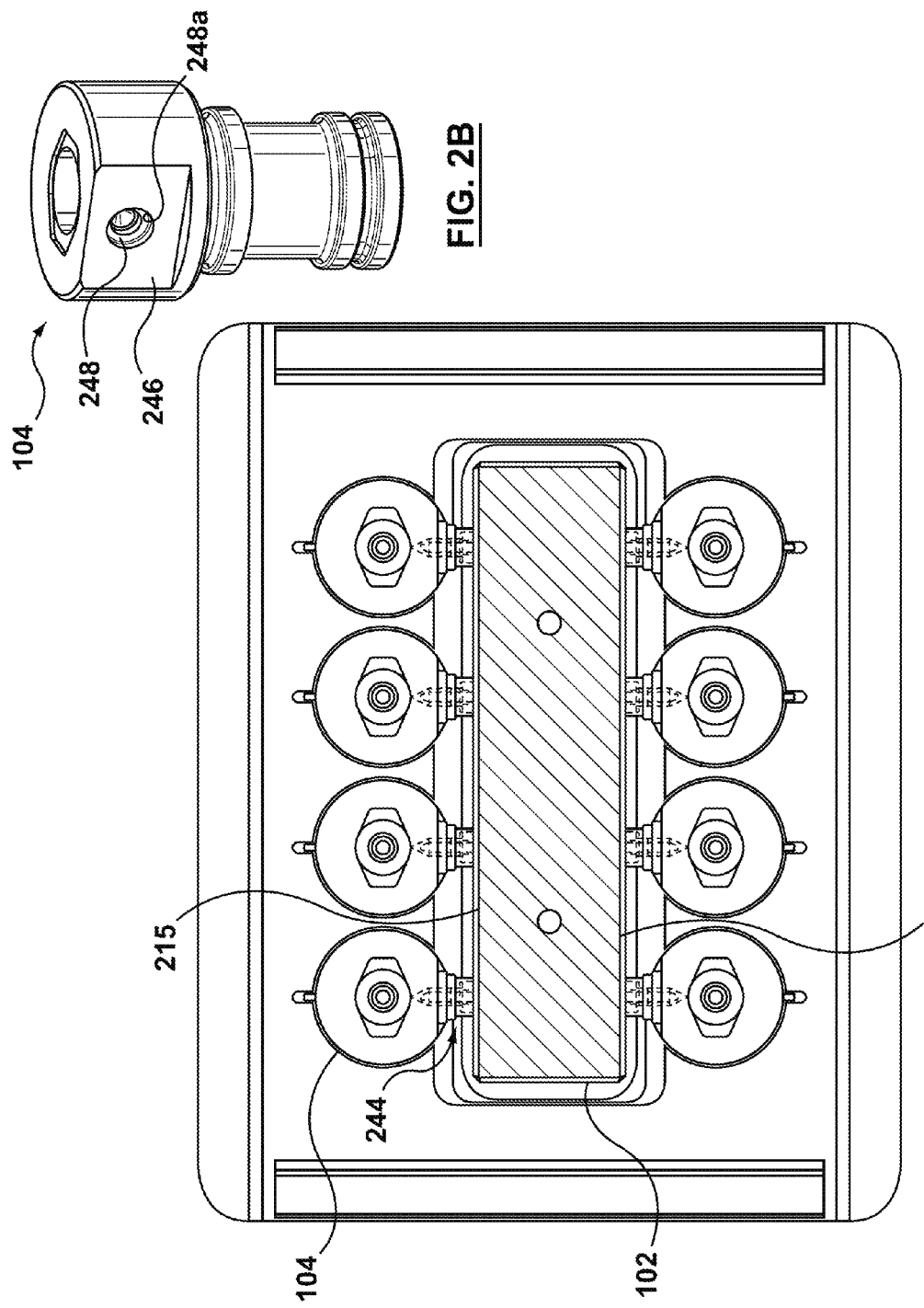

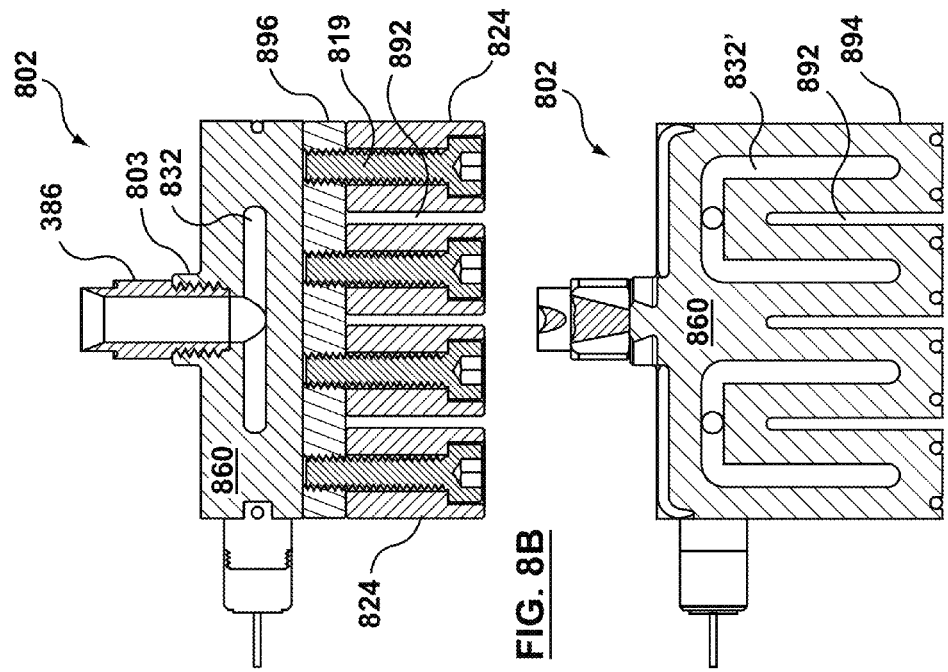
FIG. 8B
FIG. 9A
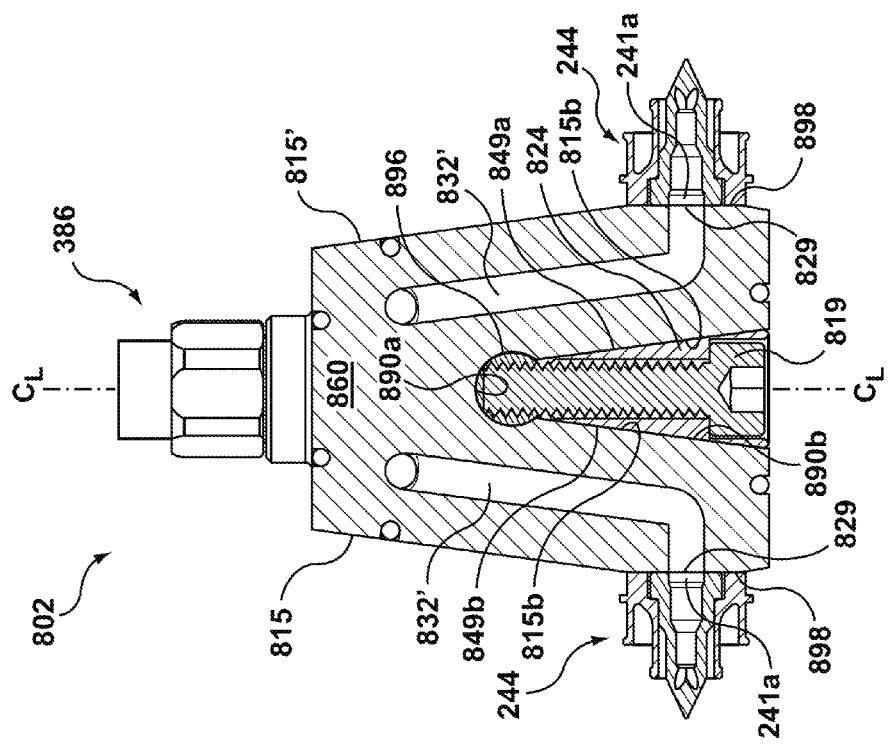
FIG. 8A

EDGE-GATED INJECTION MOLDING APPARATUS

CROSS-REFERENCE TO RELATED APPLICATIONS

This application claims the benefit under 35 U.S.C. §119 (e) of U.S. Appl. No. 61/612,149 filed Mar. 16, 2012, the disclosure of which is incorporated by reference herein in its entirety.

FIELD OF THE INVENTION

The present invention relates to an injection molding apparatus, and more particularly, to an edge-gated injection molding apparatus.

BACKGROUND OF THE INVENTION

Edge-gating applications have been developed that use an injection manifold that is in fluid communication with either a radial array of mold gates and associated mold cavities or a linear array of mold gates and associated mold cavities. When providing a melt stream to a mold gate, a nozzle tip for delivering the melt stream to the mold gate is ideally centered in the gate orifice under operating conditions to ensure consistent part quality. When providing the melt stream to a radial array of mold gates in an edge-gated application, injection manifolds known in the art tend to be cylindrical or puck-shaped, which results in thermal expansion of the injection manifold under operating conditions being directed primarily radially outward from a center of the injection manifold toward each nozzle tip and associated mold gate such that alignment between the nozzle tip and mold gate is substantially constant under both hot and cold conditions. Accordingly, each nozzle tip may have an upstream end thereof held within a side surface of the cylindrical or puck-shaped injection manifold and a downstream end thereof held within a cavity plate or cavity insert that forms the mold gate without thermal expansion adversely affecting operation thereof.

When providing the melt stream to a linear array of mold gates in an edge-gated application, injection manifolds known in the art tend to be rectangular in shape with a row of nozzle tips secured within each of the opposing sides of the injection manifold that are aligned with a corresponding row of mold gates. In order to assure alignment between each nozzle tip and its respective mold gate under operating conditions, in the cold condition a pitch spacing between adjacent nozzle tips/melt outlets of a rectangular injection manifold is less than a spacing between their corresponding mold gates, which may be formed within a cavity plate or a respective cavity insert. However with thermal expansion of a rectangular injection manifold occurring in both lateral and longitudinal directions, each nozzle tip may experience a different amount of movement towards and/or transverse to its mold gate depending on the linear position of the nozzle tip along its respective side of the injection manifold. If such a linear injection manifold feeds only four mold cavities having a relatively close pitch spacing, that is two per side, the injection manifold will be relatively small and heat expansion will be minimal such that each nozzle tip may have an upstream end thereof held within a side surface of the rectangular injection manifold and a downstream end thereof held within a cavity plate or cavity insert that forms the mold gate without thermal expansion adversely affecting operation thereof. Conversely, if a linear injection manifold feeds a larger number of mold cavities having a relatively close pitch spacing or a smaller number of mold cavities having a relatively large pitch spacing, such as eight mold cavities with four per side, for example, there may be as much as 0.2 mm-0.3 mm misalignment between the outermost nozzle tips/melt outlets of the injection manifold, and the corresponding mold gates in a cold condition. During the thermal expansion of heated components that occurs during injection molding operations, a misalignment of this magnitude may cause severe stress on a nozzle tip that is being held, as is conventional, by both the injection manifold and cavity plate/cavity insert, and may in some instances cause a downstream end of the nozzle tip to contact a wall of the cavity plate/cavity insert that surrounds the mold gate, which may damage the nozzle tip and or result in a molded part of poor quality.

Embodiments disclosed herein are directed towards edge-gated injection molding applications for providing a melt stream to a linear array of mold gates and associated mold cavities that solve at least the aforementioned problem associated with current linear array edge-gating solutions. In addition, embodiments hereof are directed to simplifying nozzle tip replacement in edge-gating applications that does not require complete disassembly of the mold and/or to relatively easily taking out-of-service an individual edge-gated mold cavity.

BRIEF SUMMARY OF THE INVENTION

Embodiments hereof are directed to an edge-gated injection molding apparatus having an injection manifold assembly for distributing a melt stream of moldable material to a plurality of mold cavities aligned on opposing sides of the injection manifold assembly. The injection manifold assembly includes a plurality of melt outlets and a plurality of biasing components that are securable along a centerline of the injection manifold assembly so that each biasing component is disposed between an opposing pair of melt outlets. Each biasing component biases the opposing pair of melt outlets outward from the centerline of the injection manifold assembly toward a respective mold cavity associated with each melt outlet. A plurality of nozzle seals are in fluid communication with the plurality of melt outlets of the injection manifold assembly for receiving the melt stream therefrom and delivering the melt stream to the plurality of mold cavities. An upstream end of each nozzle seal is slidably disposed against a respective melt outlet of the injection manifold assembly and a downstream end of each nozzle seal is slidably received within a bore of a cavity plate or cavity insert that surrounds a mold gate of a respective mold cavity associated with the respective melt outlet, which assures alignment between each edge-gated nozzle seal and its respective mold gate under both hot and cold conditions.

The sliding relationship between the upstream end of each nozzle seal and its respective melt outlet of the injection manifold assembly, while the downstream end of the nozzle seal is securely held relative to the mold gate, permits misalignment between a melt inlet of the nozzle seal and its respective injection manifold assembly melt outlet in the cold condition without causing stress on the nozzle seal. Moreover when the edge-gated injection molding apparatus is brought to an operating temperature, the sliding relationship permits alignment between the melt inlet of the nozzle seal and its respective melt outlet to occur during thermal expansion of the injection manifold assembly, which may occur in both lateral and longitudinal directions depending on the linear position of the nozzle seal along the injection manifold assembly. In addition, the outward biasing of each opposing pair of melt outlets by its respective biasing component applies a preload to the nozzle seals associated therewith such that an operator may more conveniently apply any required preload from the parting line $P_L$ of the mold.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 1 is a perspective view of an edge-gated injection molding apparatus in accordance with an embodiment hereof.

FIG. 1A is a bottom view of a portion of the edge-gated injection molding apparatus of FIG. 1 with the injection manifold assembly shown in section.

FIG. 2B is a perspective view of a downstream end of a cavity insert in accordance with an embodiment hereof.

FIG. 8A is a cross-sectional view of the injection manifold assembly shown in FIGS. 8 and 9 taken along line A-A of FIG. 8.

FIG. 8B is a sectional view of the injection manifold assembly shown in FIGS. 8 and 9 taken along line B-B of FIG. 8.

FIG. 9A is a sectional view of the injection manifold assembly shown in FIGS. 8 and 9 taken along line A-A of FIG. 9.

DETAILED DESCRIPTION OF THE INVENTION

Specific embodiments of the present invention are now described with reference to the figures, wherein like reference numbers indicate identical or functionally similar elements. The following detailed description is merely exemplary in nature and is not intended to limit the invention or the application and uses of the invention. In the following description, "downstream" is used with reference to the direction of mold material flow from an injection unit of an injection molding machine to a mold cavity of a mold of an injection molding system, and also with reference to the order of components or features thereof through which the mold material flows from the injection unit to the mold cavity, whereas "upstream" is used with reference to the opposite direction. Although the description of embodiments hereof is in the context of a hot runner injection molding system, the invention may also be used in other molding applications where it is deemed useful, nonlimiting examples of which include, molding of thermoset resins such as liquid silicone rubber or the like. Furthermore, there is no intention to be bound by any expressed or implied theory presented in the preceding technical field, background, brief summary or the following detailed description.

Figure 2:
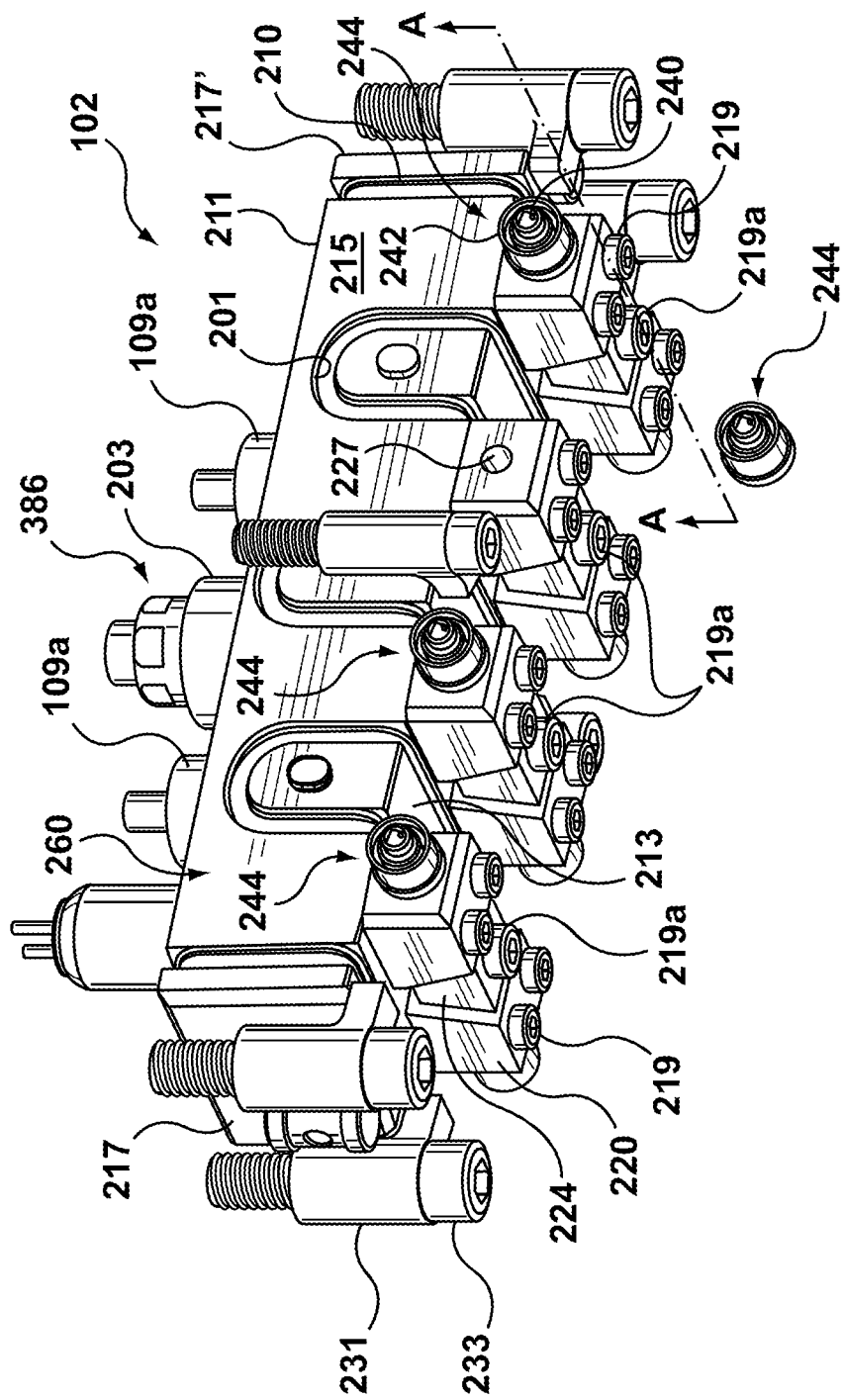
FIG. 2 is a perspective view of an injection manifold assembly in accordance with an embodiment hereof.

FIG. 1 is a perspective view of an edge-gated injection molding apparatus 100 in accordance with an embodiment hereof, with FIG. 2 being a perspective view of an injection manifold assembly 102 in accordance with an embodiment hereof removed from injection molding apparatus 100. It would be understood by one of ordinary skill in the art that injection molding apparatus 100 constitutes a hot half of a molding system that is designed to mate with a cold half and cavity inserts 104 thereof in an injection molding machine (not shown). It also would be understood by one of ordinary skill in the art that in use injection molding apparatus 100 is housed within various mold plates, such as, for example, a back plate 312, a manifold plate 314, a cooled mold plate 316 and a cavity plate 318 as shown with reference to FIG. 3, which depicts a sectional view of apparatus 100 taken along line A-A of FIG. 1 assembled for use.

Figure 3:
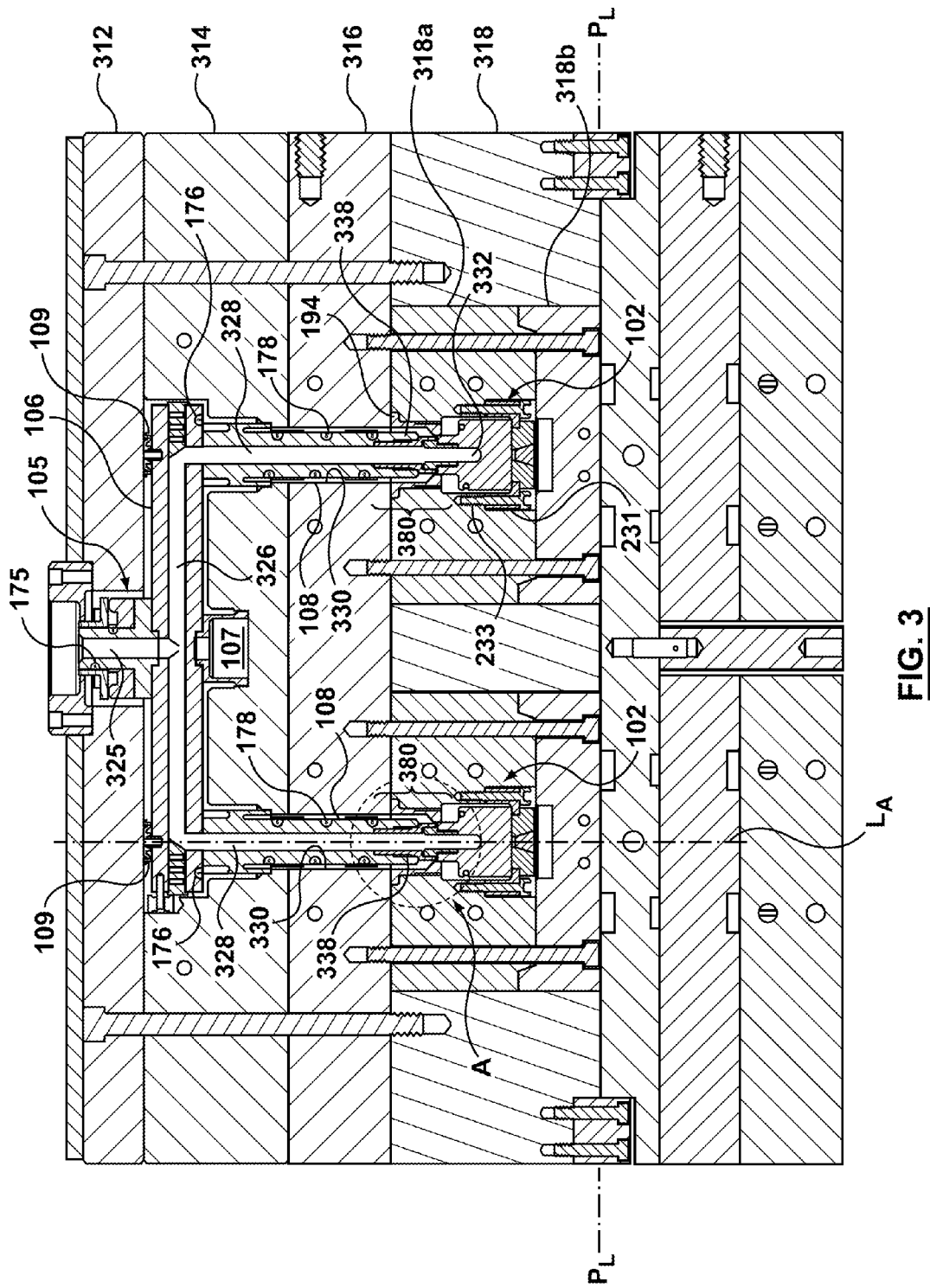
FIG. 3 depicts a sectional view of the edge-gated injection molding apparatus of FIG. 1 as taken along line A-A of FIG. 1.

With reference to FIGS. 1 and 3, edge-gated injection molding apparatus 100 includes a heated inlet or sprue 105, a hot runner injection molding manifold 106 and two hot runner injection molding nozzles 108 for directing a melt stream of moldable material under pressure from an injection molding machine nozzle (not shown) to an injection manifold assembly 102 from which the melt stream is delivered to a plurality of cavity inserts 104, as explained in more detail below. Sprue 105 includes a heater 175, manifold 106 includes a heater 176, each nozzle 108 includes a heater 178 and each injection manifold assembly 102 includes a heater 172, which are provided for keeping the melt stream of moldable material at a proper processing temperature. Exemplary heaters for use in embodiments hereof may include a wire element heater embedded within or simply wrapped around the hot runner component, such as heaters 172, 175, 176, 178, or a band or cartridge heater where suitable. Sprue 105 is partially disposed within back plate 312 and includes an inlet melt channel 325 for directing the melt stream received from the machine nozzle to a manifold melt channel 326 of manifold 106 that in turns divides the melt stream for distribution to a respective nozzle melt channel 328 of each injection molding nozzle 108. Each nozzle 108 directs the melt stream to a melt channel 332 of injection manifold assembly 102, as explained in more detail below. As would be understood by one of ordinary skill in the art, manifold 106 is located within back plate 312 and cooled manifold plate 314 surrounded by an insulative air gap, wherein an axial position of manifold 106 within the air gap relative to back plate 312 and manifold plate 314 is maintained during operation by a locating ring 107 and various pressure disks 109. Pressure disks 109 also aid in establishing a seal between manifold 106 and each nozzle 108 to prevent melt leakage at the interface between the respective manifold and nozzle melt channels 326, 328 during operation. A person of ordinary skill in the art would understand that there are various ways to axially fix manifold 106 within injection molding system without departing from the scope of the present invention.

Figure 3A:
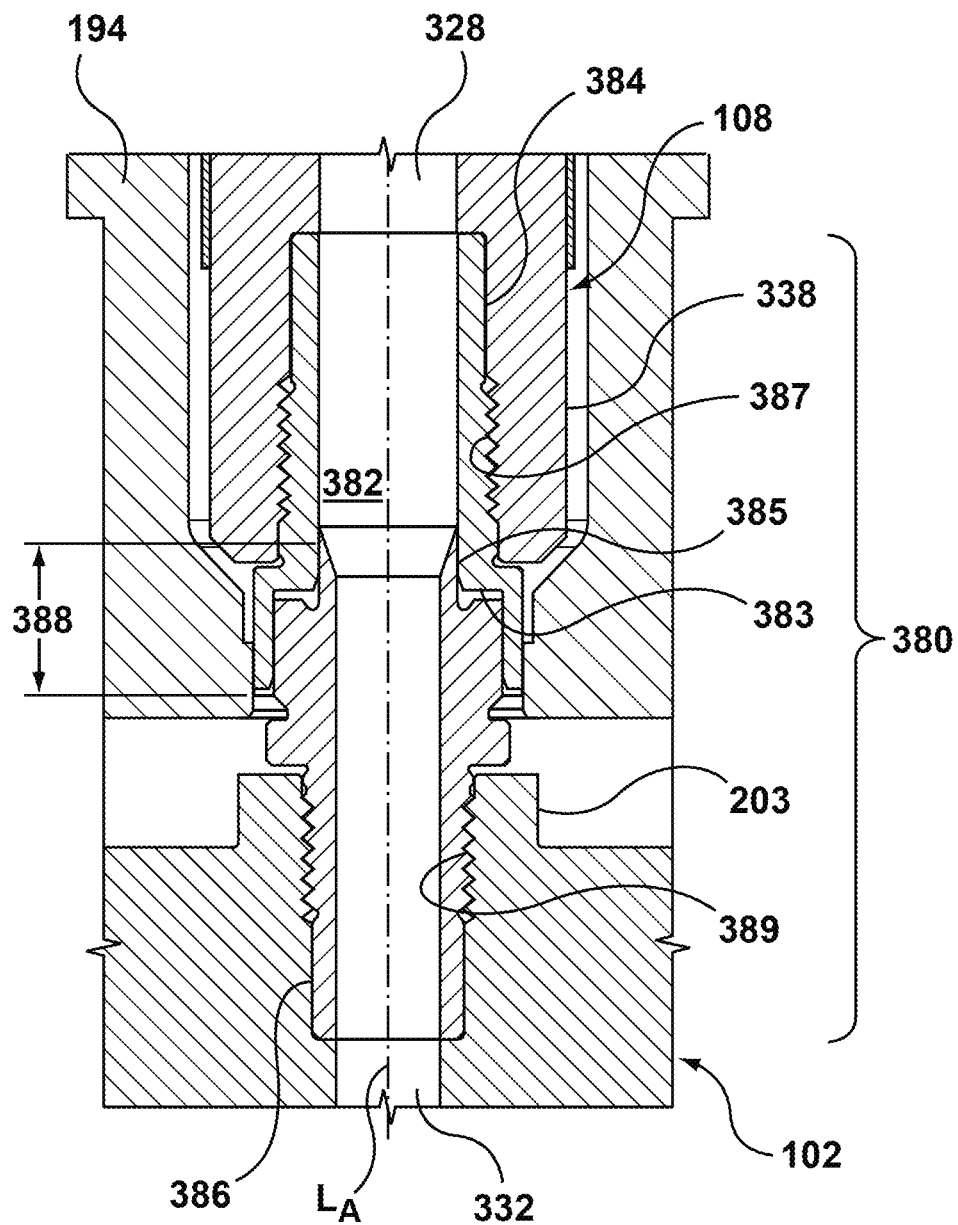
FIG. 3A depicts an enlarged view of an area A of FIG. 3.

Each nozzle 108 extends within a corresponding opening 330 defined by manifold plate 314, mold plate 316 and an alignment insert 194 within cavity insert plate 318a. Opening 330 is sized to provide an insulative air gap between the heated nozzle 108 and the aforementioned cooled manifold, mold and cavity insert plates 314, 316, 318a. With reference to FIG. 3A that depicts an enlarged view of an area A of FIG. 3, a downstream end 338 of each nozzle 108 is configured to be coupled to a respective injection manifold assembly 102 via a telescopic connector 380 to permit relative sliding movement therebetween, so as to accommodate axial thermal expansion along longitudinal axis $L_A$. An exemplary arrangement for telescopic connector 380 is represented in FIG. 3A, in which an upstream connector component 384 and a downstream connector component 386 are shown. Upstream connector component 384 attached to nozzle downstream end 338 slides against alignment insert 194 to align nozzle 108 with injection manifold assembly 102. Upstream connector component 384 is attached to nozzle downstream end 338 and downstream connector component 386 is attached within an upstream end 203 (also referred to herein as a melt inlet 203) of injection manifold assembly 102 so as to be slidable relative to each other by way of a sliding interface 388. While configurable in a variety of ways, sliding interface 388 is shown as upstream connector component 384 providing a stepped bore 383 in which a corresponding stepped extension 385 of downstream connector component 386 is slidingly received. In an embodiment, downstream end 338 of nozzle 108 is provided with a threaded bore 387 to receive a complimentary threaded portion of upstream connector component 384. Similarly, upstream end or melt inlet 203 of injection manifold assembly 102 is provided with a threaded bore 389 to receive a complimentary threaded portion of downstream connector component 386. As such, nozzle 108 and injection manifold assembly 102 are coupled via telescopic connector 380, whereby nozzle melt channel 328 is in fluid communication with injection manifold melt channel 332. As such, telescopic connector 380 defines a linking melt channel 382 to permit the aforementioned fluid communication between melt channels 328, 332 of nozzle 108 and injection manifold assembly 102. In an embodiment (not shown), upstream connector component 384 may be integrally formed with nozzle downstream end 338 and downstream connector component 386 may be integrally formed with upstream end 203 of injection manifold assembly 102. In a further embodiment (also not shown), nozzle 108 may be fixedly connected to injection manifold assembly 102, and a telescopic connector is used between an upstream end of nozzle 108 and manifold 106.

Figure 2A:
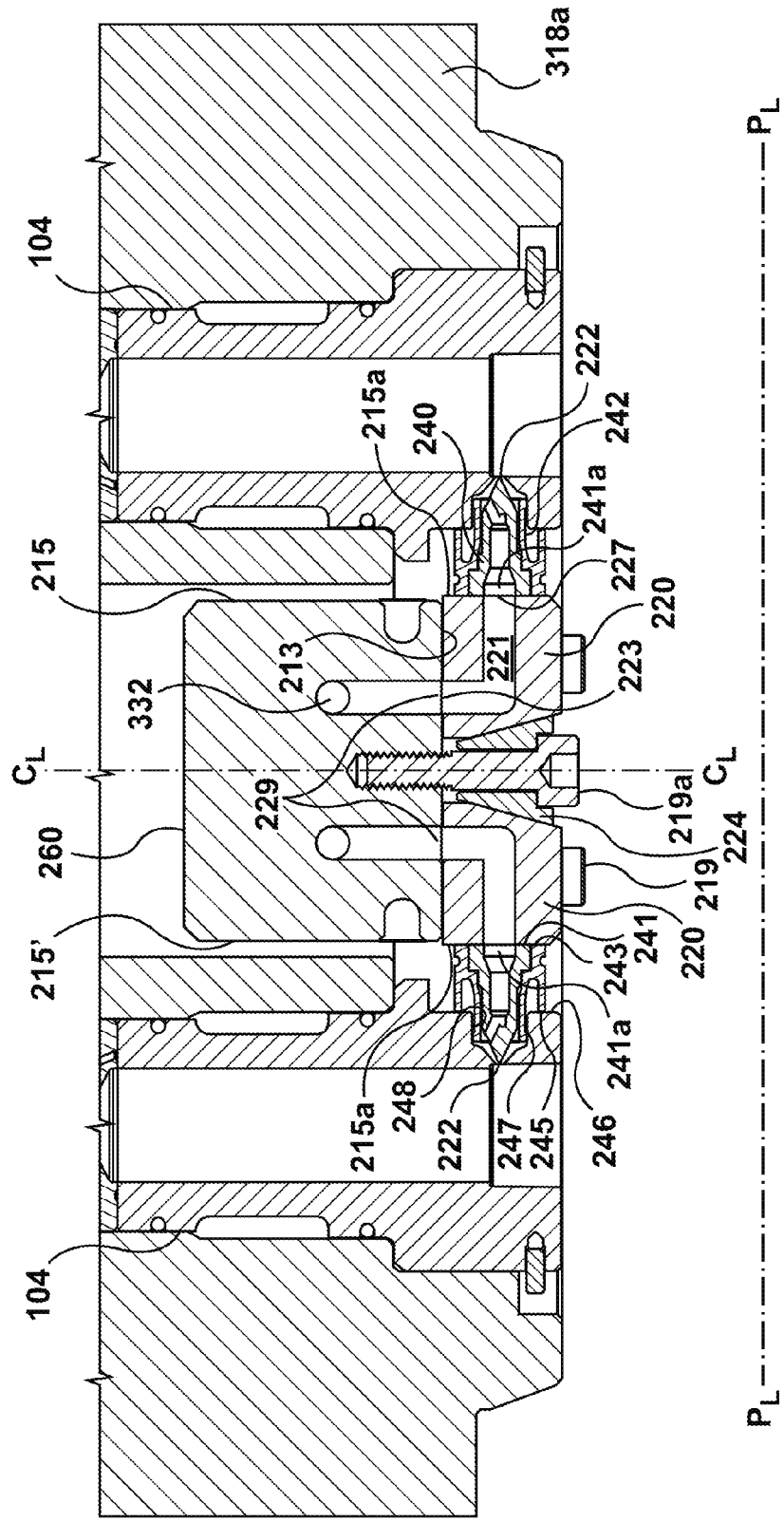
FIG. 2A is an enlarged sectional view of the injection manifold assembly of FIG. 2 as taken along line A-A of FIG. 2, with the injection manifold shown installed within the injection molding apparatus of FIGS. 1 and 3.

FIG. 2 is a perspective view of injection manifold assembly 102 removed from injection molding apparatus 100 and FIG. 2A is an enlarged sectional view of injection manifold assembly 102 taken along line A-A of FIG. 2, wherein the injection manifold assembly is depicted as installed within a portion of injection molding apparatus 100 as shown in FIG. 3. In the embodiment shown in FIG. 2, injection manifold assembly 102 has a substantially brick or cuboid shaped injection manifold 260 that defines an upstream surface 211, a downstream surface 213, opposing side surfaces 215, 215' and opposing end surfaces 217, 217'. A set of spacers 109a shown on upstream surface 211 of injection manifold assembly 102 and are configured to mate within bores or openings (not shown) within cavity insert plate 318a to assure proper positioning and to create a standoff support with minimal heat loss. Spacers 109a will counteract forces from one or more fasteners, such as cap screws 233, when injection manifold assembly 102 is installed as discussed further below.

FIG. 1A is a bottom view of a portion of edge-gated injection molding apparatus 100 of FIG. 1 with injection manifold assembly 102 shown in section depicting a plurality of nozzle seals 244 in fluid communication with a plurality or cavity inserts 104 that are aligned along opposing side surfaces 215, 215' of injection manifold assembly 102. Accordingly, injection manifold assembly 102 provides a melt stream to a linear array of mold cavities, each of which is partially defined by a respective cavity insert 104. Injection manifold 260 has a continuous groove 201 formed within its upstream and downstream surfaces 211, 213 and opposing side surfaces 215, 215' for receiving a heating element 210 of heater 172. With reference to FIGS. 2 and 3, a plurality of L-shaped couplers or clamps 231 and associated cap screws 233 are used to secure injection manifold assembly 102, and more particularly injection manifold 260, to cavity insert plate 318a. The attachment of injection manifold 260 to cavity insert plate 318a by L-shaped couplers 231 ensures that the injection manifold 260 is held in place against the injection pressure force at the inlet of connector component 386 in embodiments that use a telescopic connector to accommodate axial thermal expansion, such as the shown in the embodiment of FIG. 3. In addition, cap screws 233 and L-shaped couplers 231 are accessible from a parting line $P_L$ of edge-gated injection molding apparatus 102 upon removal of a cover plate 318b, such that the entire injection manifold assembly 102 may be removed from the parting line $P_L$ of the mold.

In another embodiment, an injection manifold 260 may be made of a sufficient width and length such that longitudinal bores may be made therein for receiving cap screws 233 there through to secure injection manifold 260 to a respective cavity insert plate 318a, in which complementary threaded holes for receiving a respective cap screw 233 would be provided. In another embodiment, an injection manifold 260 may be of a sufficient width and length so as to include threaded bores therein that align with through holes in a respective cavity insert plate 318a through which cap screws 233 may extend to couple the injection manifold 260 to the respective cavity insert plate 318a.

Injection manifold 260 includes melt inlet 203 in upstream surface 211 that is in fluid communication with melt channel 332 formed therein for receiving a melt stream of moldable material, as described above, and distributing the melt stream via a plurality of melt outlets 229 in downstream surface 213 to a plurality of diverter blocks 220. Each diverter block 220 includes a melt inlet 223 and a melt outlet 227 with a melt channel 221 extending therebetween. In the embodiment shown in FIGS. 2 and 2A, each diverter block 220 is individually coupled to downstream surface 213 of injection manifold 260 by cap screws 219 to be positioned such that each diverter block melt inlet 223 is aligned with a respective melt outlet 229 in injection manifold bottom surface 213 and such that a flat outside or exterior side surface 215a of each diverter block 220, which includes a respective diverter block melt outlet 227, is substantially parallel to a respective side surface 215, 215' of injection manifold 260. In the embodiment shown in FIG. 2A, diverter block melt channel 221 includes a substantially 90° bend for directing the melt stream received through diverter block melt inlet 223 in an upstream surface thereof to diverter block melt outlet 227 in outside or exterior side surface 215a thereof.

A nozzle seal 244 is disposed against the melt outlet 227 of each diverter block 220 for receiving the melt stream therefrom. In the embodiment shown in FIGS. 2 and 2A, nozzle seal 244 includes a nozzle tip 240 that is slidably received within a corresponding bore of a gate seal 242 such that the two pieces are substantially coaxial. In embodiments hereof, nozzle tip 240 may be formed from a thermally conductive material, such as beryllium copper or other copper alloy, and gate seal 242 may be formed from a less thermally conductive material, such H13 steel or titanium. A downstream end of gate seal 242 includes an outer circumferential face seal surface 245 that contacts and seals against a first sealing surface 246 of cavity insert 104 and an inner circumferential, primary seal surface 247 that contacts and seals against a second sealing surface 248 of cavity insert 104. With reference to FIG. 2B, which is a perspective view of a downstream end of cavity insert 104, second sealing surface 248 is located within a counter bore 248a that surrounds a mold gate 222 of cavity insert 104. An upstream surface 241 of nozzle tip 240 and an upstream surface 243 of its corresponding gate seal 242 are slidably disposed against a respective outside or exterior side surface 215a of diverter block 220 and are otherwise not directly attached or secured thereto. In an embodiment in the cold condition, upstream surface 241 of nozzle tip 240 may extend or project from upstream surface 243 of gate seal 242 to concentrate sealing forces at a mating diverter block melt outlet 227 and nozzle tip melt inlet 241a.

In another embodiment (not shown), nozzle seal 244 may be used in a straight-gated, as opposed to edge-gated, injection molding application with outer circumferential face seal surface 245 contacting and sealing against a planar surface of a mold cavity plate or the like that surrounds a counter bore that defines a mold gate through a downstream end thereof. Inner circumferential, primary seal surface 247 of nozzle seal 244 in this straight-gated injection molding application will contact and seal against a second sealing surface 248 located within the counter bore. An upstream surface 241 of nozzle tip 240 and an upstream surface 243 of its corresponding gate seal 242 will be slidably disposed against a respective downstream surface of an injection manifold to be in fluid communication with a melt outlet therein, but otherwise would remain unattached or unsecured thereto.

Figure 4:
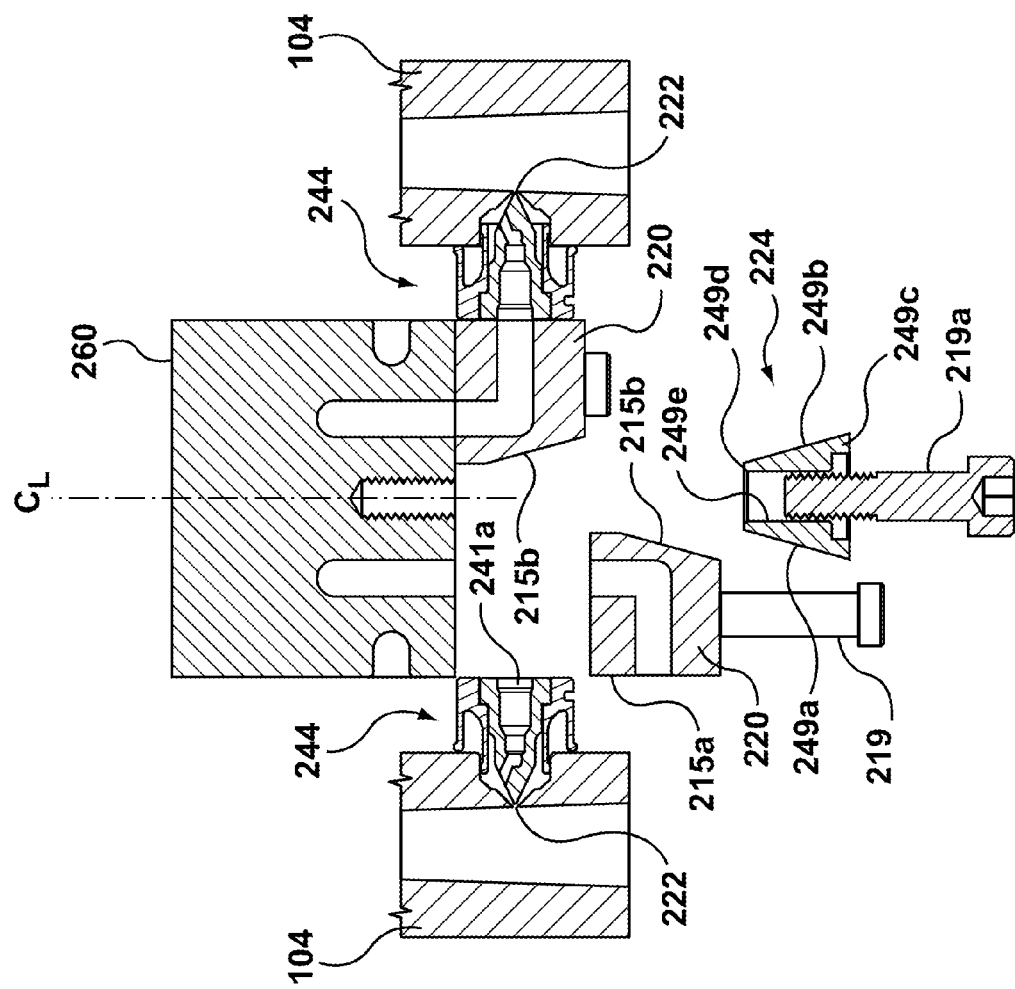
FIG. 4 depicts the disassembly of a portion of the injection molding apparatus shown in FIG. 2A in accordance with an embodiment hereof.

A series of biasing or wedge components 224 are coupled along substantially a centerline $C_L$ of downstream surface 213 of injection manifold 260 by respective cap screws 219a such that each wedge component 224 is disposed between a pair of diverter blocks 220. With reference to FIG. 4, which shows a diverter block 220 and a wedge component 224 disassembled from an injection manifold 260, wedge component 224 has a trapezoidal cross-section with opposing side contact surfaces 249a, 249b of wedge component 224 being angled toward each other as each surface extends from a base surface 249c to an apical surface 249d, wherein a width of base surface 249c is greater than a width of apical surface 249d. Each wedge component 224 defines a longitudinal bore 249e for receiving a respective cap screw 219a therethrough. In an embodiment, longitudinal bore 249e may be threaded to receive a complementary threaded tool, such as a larger sized socket head cap screw, to assist in the removal of the wedge component 224. As well, the longitudinal bores (not shown) of each diverter block 220 for receiving cap screws 219 may be threaded for the same purpose.

Each diverter block 220 includes an inside or interior side surface 215b that is angled to abut against a corresponding side contact surface 249a, 249b of wedge component 224. With this configuration nozzle seals 244, diverter blocks 220, and wedge components 224 may be assembled and disassembled from a parting line $P_L$ of the mold upon removal of cover plate 318b. Additionally, the torqueing of screw 219a within wedge component 224 biases an opposing pair of diverter blocks 220 and associated nozzle seals 244 outward from centerline $C_L$ of the injection manifold assembly 102 toward their respective mold cavities thereby applying a preload to each of the nozzle seals 244 to help prevent leakage at the interface between each diverter block 220 and injection manifold 260 and at the interface between each diverter block 220 and its associated nozzle seal 244 under operating conditions. Moreover, this configuration permits an operator to more conveniently apply the preload from the parting line $P_L$ of the mold after the remainder of injection molding apparatus 100 is already assembled. In an embodiment, the injection molding system may be brought to an operating temperature and thereafter a preload may be applied, as discussed above, to prevent scoring between upstream surfaces 241, 243 of nozzle tip 240 and gate seal 242, respectively and outside or exterior side surface 215a of diverter block 220 that otherwise may have occurred if the preload were applied prior to heating-up the system.

Under operating conditions when injection manifold assembly 102 undergoes thermal expansion, a respective angled inside or interior side surfaces 215b of each diverter block 220 will bear against a corresponding side contact surface 249a, 249b of wedge component 224 to assure that thermal expansion of diverter blocks 220 occurs in the direction of the aforementioned interfaces. In embodiments hereof, accessibility of wedge component 224 from the parting line $P_L$ of the mold permits a sealing force between sealing interfaces of each diverter block to be adjusted from parting line $P_L$ and thereby prevent an excessive load on the components of the system, for instance, if a low pressure application is used.

The engagement between primary seal surface 247 of gate seal 242 and second sealing surface 248 of cavity insert 104, as described above, assures axial alignment of nozzle tip 240 with mold gate 222 in a cold condition, and together with the function of wedge component 224 during thermal expansion of injection manifold assembly 102, as described in the preceding paragraph, assures axial alignment of nozzle tip 240 with mold gate 222 under operating conditions. Conversely components 240, 242 of nozzle seal 244 and diverter block 220 may experience some misalignment between diverter block melt outlet 227 and a melt inlet 241a of nozzle tip 240 in a cold condition. However as injection molding apparatus 100 is heated to an operating temperature, the upstream surfaces 241, 243 of nozzle tip 240 and gate seal 242, respectively, are slidable along outside or exterior side or surface 215a of diverter block 220 during thermal expansion of the components to substantially eliminate any misalignment between diverter block melt outlet 227 and nozzle tip melt inlet 241a under operating conditions. Accordingly when used in linearly arranged edge-gated molding applications in accordance with embodiments hereof, the slidable interface between melt inlets of nozzle seals and melt outlets of the diverter blocks of the injection manifold assemblies permits thermal expansion of the injection manifold assemblies with respect to the nozzle seals in both longitudinal and transverse directions without damaging the nozzle seals or adversely affecting alignment between the nozzle seals and their respective mold cavities. Embodiments hereof may be used for high-cavity linearly arranged edge-gated molding applications without worrying about thermal expansion values, pitch distance, and/or the number of cavities as currently may be achieved in high-cavity straight-gated molding applications.

Figure 5:
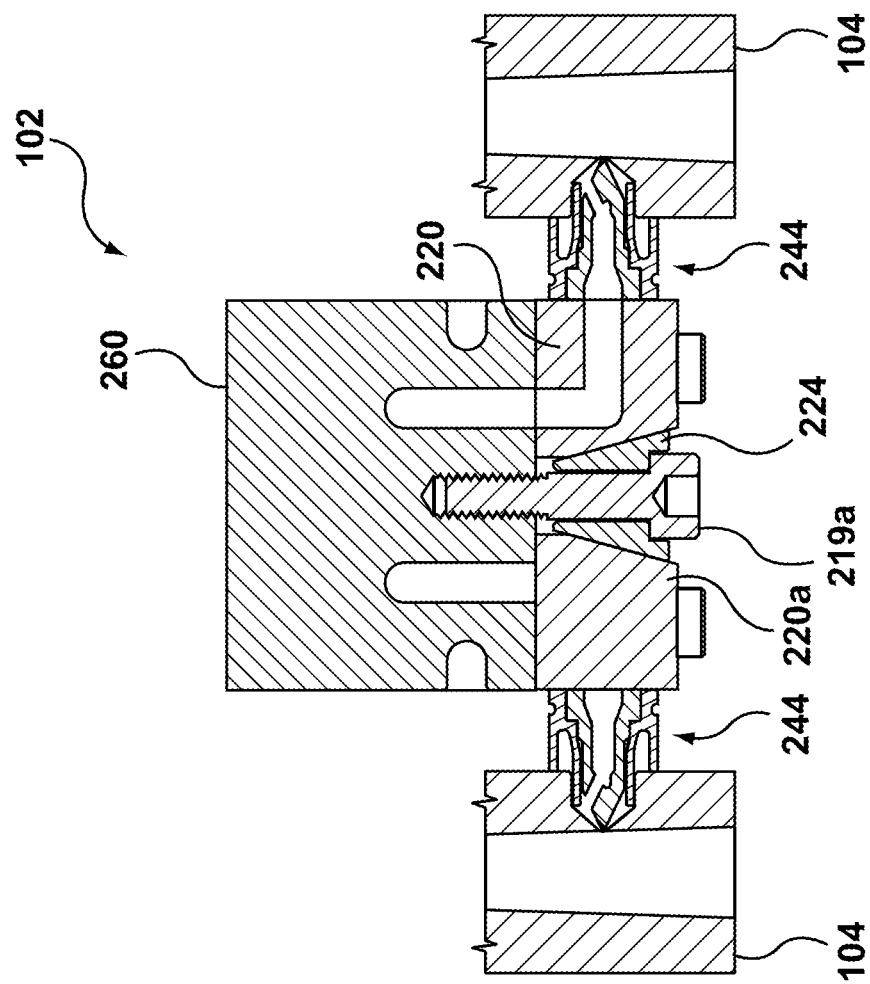
FIG. 5 depicts the portion of the injection molding apparatus shown in FIG. 4 reassembled to include a dummy diverter block in accordance with an embodiment hereof.

As noted above, FIG. 4 depicts a diverter block 220 and a wedge component 224 disassembled from an injection manifold 260, which provides access from the parting line $P_L$ of the mold upon removal of cover plate 318b to an associated nozzle seal 244 for assembly and disassembly. In an embodiment shown in FIG. 5, injection manifold assembly 102 is shown reassembled to include a dummy diverter block 220a that does not include a melt channel and is installed to selectively shut-down the mold cavity associated therewith. Dummy diverter block 220a has all other features of diverter block 220 so as to provide a preload at the interface between dummy diverter block 220a and injection manifold 260 as well as the paired diverter block 220 and nozzle seal 244 when wedge component 224 is secured to injection manifold 260 as previously discussed above.

Figure 6:
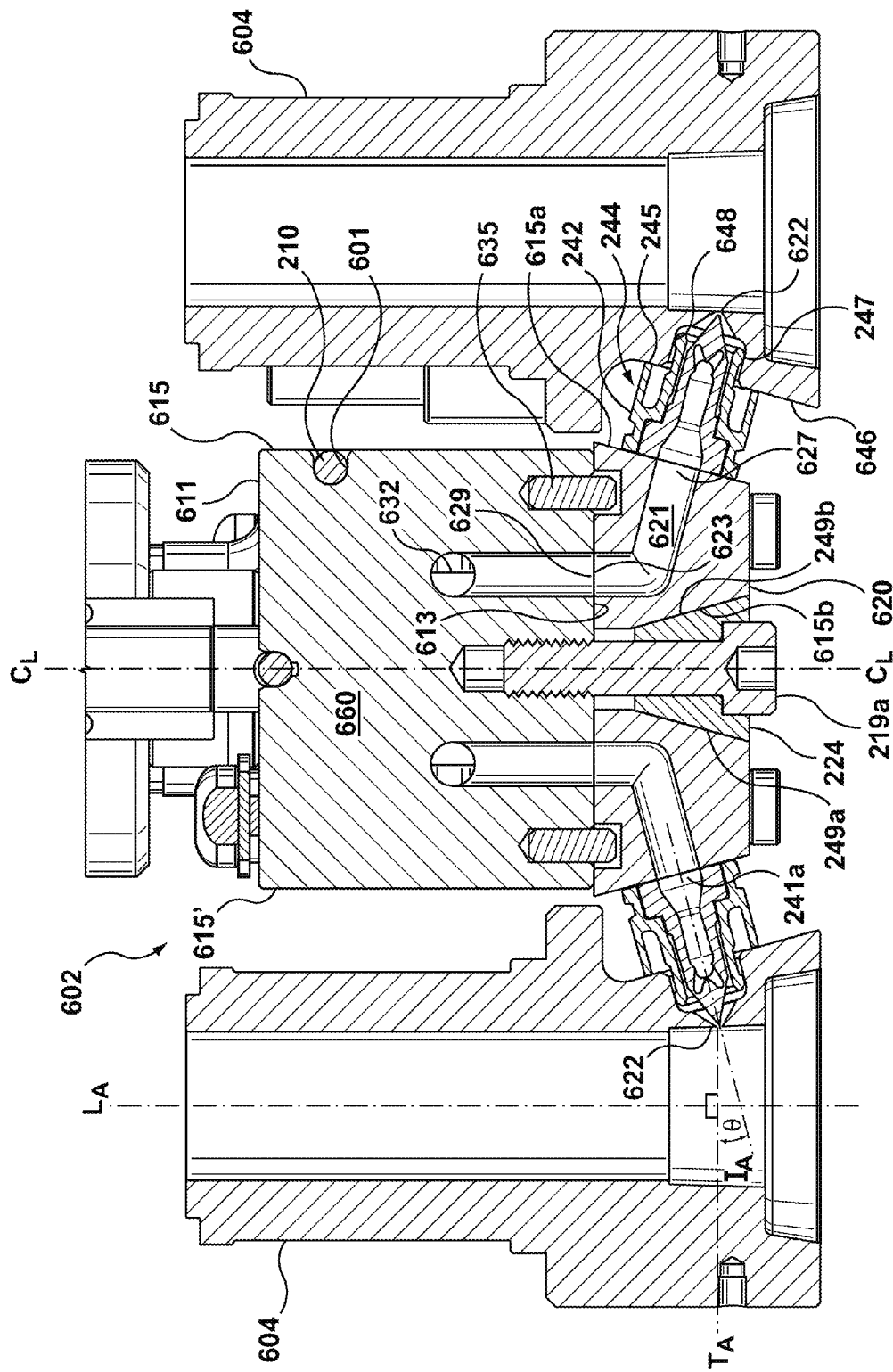
FIG. 6 is a sectional view of an injection manifold assembly in accordance with another embodiment hereof that shares features with the injection manifold assembly of FIG. 2.

FIG. 6 is a sectional view of an injection manifold assembly 602 in accordance with another embodiment hereof that shares features with the injection manifold assembly of FIG. 2. The embodiment of FIG. 6 may be used with all features described with reference to other embodiments hereof and only features that differ from those already described will be detailed herein. Injection manifold assembly 602 has a substantially brick or cuboid shaped injection manifold 660 that defines an upstream surface 611, a downstream surface 613, opposing side surfaces 615, 615' and opposing end surfaces (not shown). Injection manifold 660 has a continuous groove 601 formed in the upstream, downstream and opposing side surfaces thereof for receiving heating element 210 as similarly described above.

Injection manifold 660 includes melt channel 632 formed therein for receiving a melt stream of moldable material, as described above, and distributing the melt stream via a plurality of melt outlets 629 in downstream surface 613 to a plurality of diverter blocks 620. Each diverter block 620 includes a melt inlet 623 and a melt outlet 627 with a melt channel 621 extending therebetween and is individually coupled to injection manifold downstream surface 613 by one or more cap screws such that each diverter block melt inlet 623 is aligned with a respective injection manifold melt outlet 629. Dowels 635 are shown extending between corresponding bores in injection manifold downstream surface 613 and the upstream surface of diverter block 620 to aid in aligning melt outlet 629 and melt inlet 623 during assembly as well as to maintain alignment therebetween during thermal expansion that occurs as the system is brought to an operating temperature. Dowels may be used for this purpose in each of the embodiments described herein that utilize diverter blocks.

An outside surface 615a of each diverter block 620, which includes the diverter block melt outlet 627, is formed to be at an acute angle relative to a centerline $C_L$ of injection manifold assembly 602 such that each outside or exterior surface 615a is angled relative to a respective side surface 615, 615' of injection manifold 660. In the embodiment shown in FIG. 6, diverter block melt channel 621 includes a bend having greater than a 90° angle for directing the melt stream between diverter block melt inlet 623 in an upstream surface of diverter block 620 and diverter block melt outlet 627 in angled outside surface 615a thereof.

A first sealing surface 646 of cavity insert 604 is also formed to be at an acute angle relative to the centerline $C_L$ of injection manifold assembly 602 so as to be substantially parallel with outside or exterior surface 615a of diverter block 620. First sealing surface 646 surrounds a counter bore of cavity insert 604 that ends in mold gate 622 and defines a second sealing surface 648 of cavity insert 604. As similarly described with reference to the embodiment of FIG. 2A, an upstream surface of nozzle seal 244 that includes nozzle tip melt inlet 241a is slidingly disposed against outside surface 615a of diverter block 620 to be in fluid communication with diverter block melt outlet 627 and a downstream end of nozzle seal 244 is axially aligned with mold gate 622. More particularly, face seal surface 245 of gate seal 242 contacts and seals against first sealing surface 646 of cavity insert 604 and primary seal surface 247 of gate seal 242 contacts and seals against second sealing surface 648 of cavity insert 604 such that a longitudinal axis $I_A$ of nozzle tip 240 is held at an injection angle Θ relative to a transverse axis $T_A$ of cavity insert 604 that passes through mold gate 622 under both hot and cold conditions. In an embodiment, injection angle Θ is between 10° and 20°, however it should be understood that angle Θ can be between 0° and 90°. Nozzle seal 244 so positioned introduces the melt stream of moldable material toward a base of a core insert (not shown) of the mold cavity, which is beneficial to prevent core displacement in certain molding applications.

A series of wedge components 224 are coupled to downstream surface 613 of injection manifold 660 in a similar manner as shown and described with reference to the embodiment of FIG. 2A. Each diverter block 620 includes an inside surface 615b that is angled to abut against a corresponding side contact surface 249a, 249b of wedge component 224. This configuration permits nozzle seals 244, diverter blocks 620, and wedge components 224 to be assembled and disassembled from parting line $P_L$ of the mold. Additionally, an operator may torque a cap screw 219a within wedge component 224 to bias an opposing pair of diverter blocks 620 and associated nozzle seals 244 outward from a centerline $C_L$ of injection manifold assembly 602 toward their respective mold cavities thereby applying a preload to each of the nozzle seals 244 that prevents leakage at the interface between each diverter block 620 and injection manifold 660 and at the interface between each diverter block 620 and its associated nozzle seal 644 under operating conditions. Moreover after the remainder of the injection molding apparatus is assembled, this configuration permits an operator to apply any required preload from the parting line $P_L$ of the mold. In an embodiment, the injection molding system may be brought to an operating temperature and thereafter a preload may be applied, as discussed above, to prevent scoring that otherwise may have occurred if the preload were applied prior to heating-up the system.

As in the previous embodiment, components 240, 242 of nozzle seal 244 and diverter block 620 may experience some misalignment between diverter block melt outlet 627 and a melt inlet 241a of nozzle tip 240 in a cold condition. However as injection manifold assembly 602 is heated to an operating temperature, the upstream surfaces 241, 243 of nozzle tip 240 and gate seal 242, respectively, are slidable along outside surface 615a of diverter block 620 during thermal expansion of the components to substantially eliminate any misalignment between diverter block melt outlet 627 and nozzle tip melt inlet 241a under operating conditions. Accordingly when used in linearly arranged edge-gated molding applications in accordance with embodiments hereof, the slidable interface between melt inlets 241a of nozzle seals 244 and melt outlets 627 of diverter blocks 620 of injection manifold assembly 602 permits thermal expansion of the injection manifold assembly to occur with respect to the nozzle seals in both longitudinal and transverse directions without damaging the nozzle seals or adversely affecting alignment between the nozzle seals and their respective mold cavities.

Figure 7:
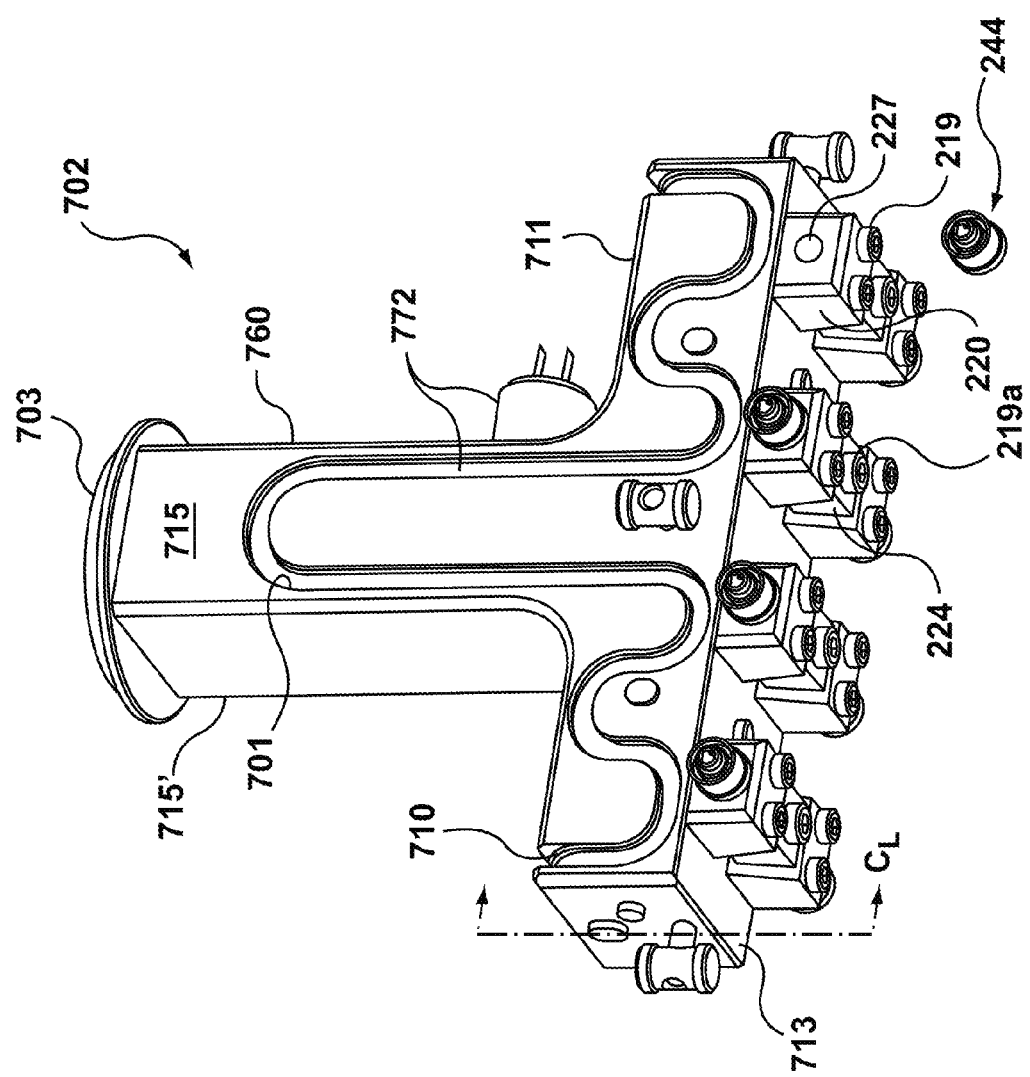
FIG. 7 is a perspective view of an injection manifold assembly in accordance with another embodiment hereof.

FIG. 7 is a perspective view of an edge-gated injection manifold assembly 702 in accordance with another embodiment hereof that shares features with edge-gated injection manifold assembly 102 of FIG. 2. The embodiment of FIG. 7 may be used with all features described with reference to other embodiments hereof and only features that differ from those already described will be detailed herein. Injection manifold assembly 702 includes a T-shaped injection manifold 760 that has a continuous groove 701 formed within its upstream surface 711 and opposing side surfaces 715, 715' for receiving a heating element 710 of a heater 772. Injection manifold 760 may be used in place of injection molding nozzle 108, telescopic connector 380 and injection manifold 260 in injection molding apparatus 100, which was described with reference to FIGS. 1 and 3. With injection manifold assembly 702 so installed in injection molding apparatus 100, a melt inlet at an upstream end 703 of injection manifold 760 is configured for transferring a melt stream of moldable material received from hot runner manifold 106 through a series of melt channels of injection manifold 760 (not shown) to a plurality of melt outlets in a downstream surface 713 of injection manifold 760. Each melt outlet of injection manifold 760 is in fluid communication with a respective diverter block 220 for delivering a portion of the melt stream thereto.

As similarly described with reference to the embodiments above, each diverter block 220 is secured to downstream surface 713 of injection manifold 760 via cap screws 219 and has a melt outlet 227 that is in fluid communication with a nozzle seal 244 for injecting the melt stream into a mold cavity of a respective cavity insert 104 during a molding cycle. Nozzle seal 244 has an upstream end that is slidably disposed against a surface that surrounds melt outlet 227 of diverter block 220 and has a downstream end that is secured within a corresponding bore that surrounds a mold gate of the respective mold cavity associated therewith, as described with reference to the previous embodiments. In this manner, the downstream end of the gate seal of nozzle seal 244 seals on an outer circumferential surface within the counter bore surrounding it respective mold gate and assures axial alignment of nozzle tip 240 with the mold gate under both cold and hot conditions. As in the previous embodiment, the slidable interface between nozzle seal 244 and diverter block 220 permits some misalignment between a melt inlet 241a of nozzle tip 240 and its respective melt outlet 227 in a cold condition. However as edge-gated injection manifold assembly 702 is heated to an operating temperature, the upstream surfaces 241, 243 of nozzle tip 240 and gate seal 242, respectively, are slidable along the surface of diverter block 220 during thermal expansion of the components to substantially eliminate any misalignment between nozzle tip melt inlet 241a and its respective diverter block melt outlet 227 under operating conditions. Accordingly when used in linearly arranged edge-gated molding applications in accordance with embodiments hereof, the slidable interface between melt inlets 241a of nozzle seals 244 and melt outlets 227 of diverter blocks 220 of injection manifold assembly 702 permits thermal expansion of the injection manifold assembly with respect to the nozzle seals in both longitudinal and transverse directions without damaging the nozzle seals or adversely affecting alignment between the nozzle seals and their respective mold cavities.

As in the previous embodiments, a plurality of wedge components 224 are coupled to downstream surface 713 of injection manifold 760 in a similar manner as shown and described with reference to the embodiment of FIG. 2A, wherein each wedge component 224 may be used to apply a preload to an opposing pair of nozzle seals 244 that are associated therewith. More particularly, the torqueing of screw 219a within wedge component 224 biases an opposing pair of diverter blocks 220 and associated nozzle seals 244 outward from a centerline $C_L$ of the injection manifold 760 toward their respective mold cavities (not shown) thereby applying a preload to each of the nozzle seals 244 that prevents leakage at the interface between each diverter block 220 and injection manifold 760 and at the interface between each diverter block 220 and its associated nozzle seal 244 under operating conditions. This configuration also provides access from the parting line $P_L$ of the mold to the nozzle seals 244 for assembly and disassembly.

Figure 8:
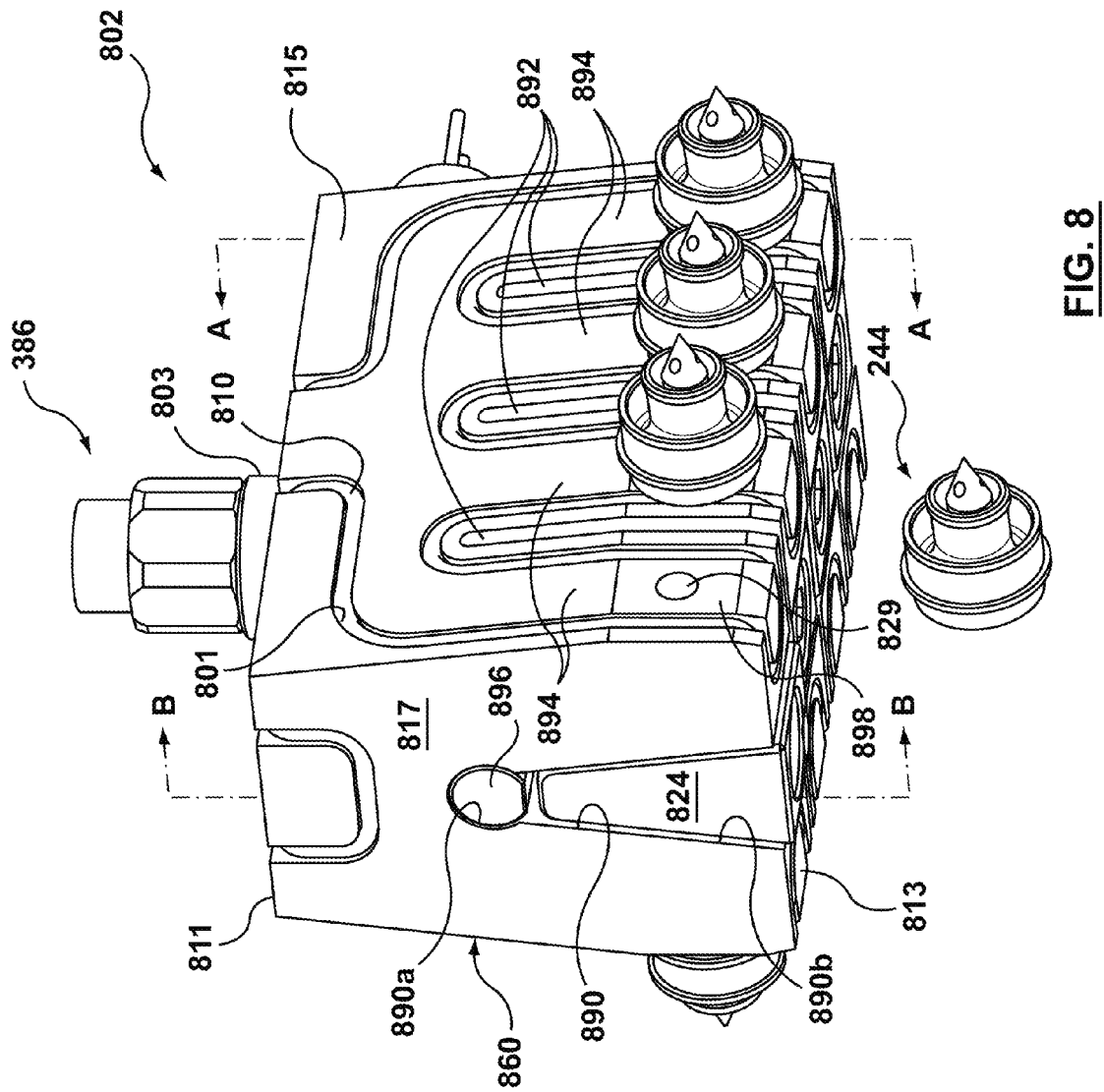
FIGS. 8 and 9 are perspective views of an injection manifold assembly in accordance with another embodiment hereof.
Figure 9:
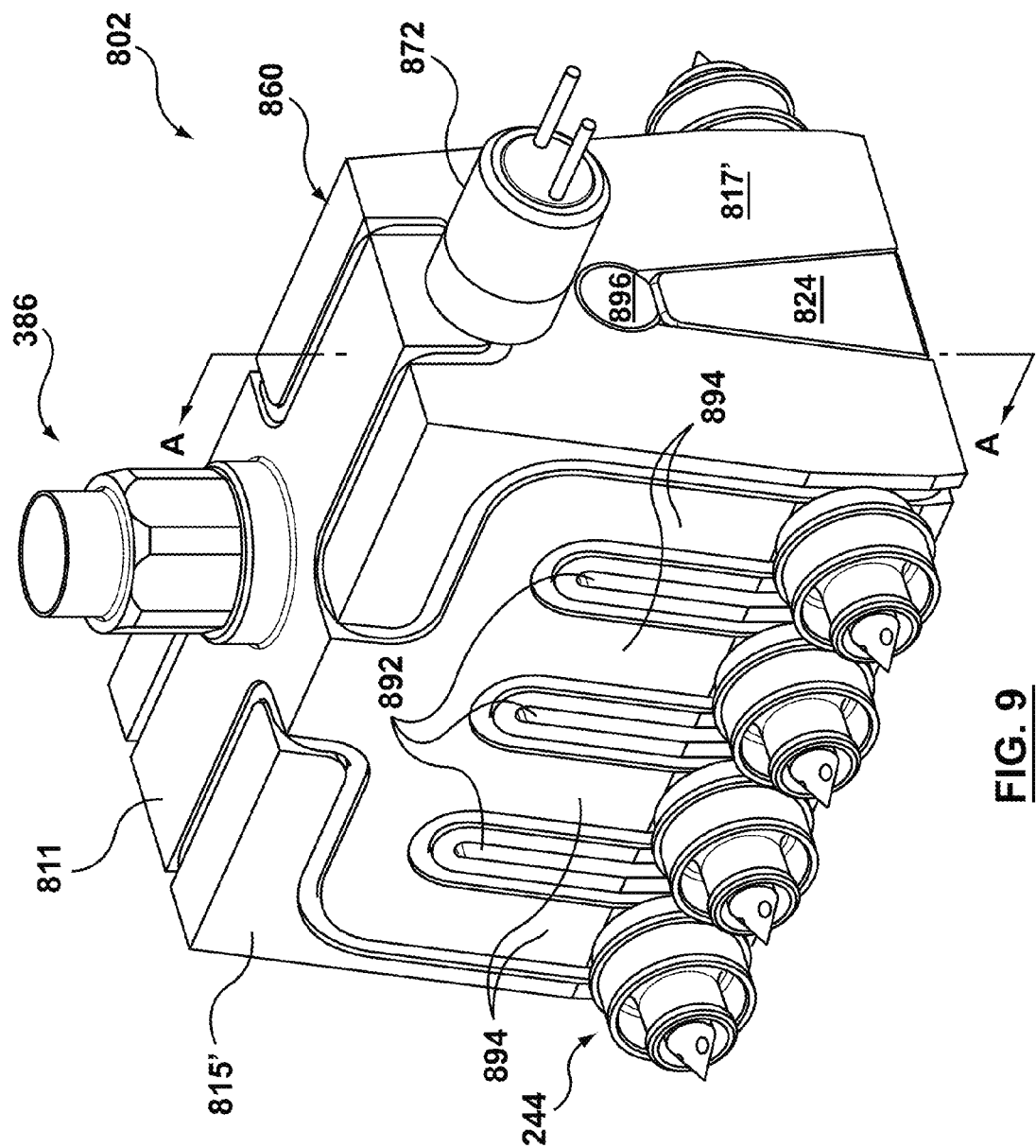

FIGS. 8 and 9 are perspective views of an injection manifold assembly 802 in accordance with another embodiment hereof with FIGS. 8A, 8B and 9A depicting various sectional views of injection manifold assembly 802 taken along lines A-A and B-B of FIG. 8 and line A-A of FIG. 9, respectively. The embodiment of FIGS. 8 and 9 may be used with features described with reference to other embodiments hereof and only features that differ from those already described will be detailed herein. Injection manifold assembly 802 includes an injection manifold 860 that has upstream surface 811, downstream surface 813, opposing side surfaces 815, 815' and opposing end surfaces 817, 817'. A keyed opening 890 is formed between opposing end surfaces 817, 817' of injection manifold 860. A substantially circular cross-sectioned portion 890a of keyed opening 890 is spaced from upstream surface 811 of injection manifold 860 along a centerline $C_L$ thereof. A substantially trapezoidal cross-sectioned portion 890b of keyed opening 890 extends from circular cross-sectioned portion 890a through downstream surface 813 of injection manifold 860 to create a gap therein. Injection manifold 860 also includes a series of slots 892, wherein each slot 892 extends through an opposing side surface 815, 815' to keyed opening 890. Slots 892 help to define a row of finger portions 894 of injection manifold 860 that define or otherwise align on each side of keyed opening 890. As in the previous embodiments, a groove 801 is formed within upstream surface 811, downstream surface 813, and opposing side surfaces 815, 815' of injection manifold 860 for receiving a heating element 810 of a heater 872. Finger portions 894 are configured to flex outwardly as discussed in more detail below, and slots 892 thermally isolate finger portions 894 from each other to avoid overheating under operating conditions the finger portions 894 that are positioned inward of end surfaces 817, 817'.

Injection manifold 860 includes a melt channel 832 formed therein for receiving a melt stream of moldable material and distributing the melt stream via a series of melt channels 832' to a plurality of melt outlets 829. In this embodiment, each finger portion 894 of injection manifold 860 includes a segment of a melt channel 832' and a melt outlet 829, which is formed through a respective outward facing side surface 898 thereof. Each melt outlet 829 is in fluid communication with a respective nozzle seal 244 that is in direct fluid communication with a mold cavity during a molding cycle. As similarly described with reference to the embodiments above, each nozzle seal 244 has an upstream end that is slidably disposed against planar side surface 898 that surrounds melt outlet 829 of finger portion 894 with a downstream end of each nozzle seal 244 being slidably receivable within a corresponding bore that surrounds a mold gate of the respective mold cavity associated therewith, as shown and described with reference to the embodiments of FIGS. 2A and 6. Accordingly, nozzle seals 244 are otherwise not directly attached or directly secured to injection manifold 860.

The engagement between primary seal surface 247 of gate seal 242 and second sealing surface 248 of cavity insert 104, as described above, assures axial alignment of nozzle tip 240 with a respective mold gate (not shown) in a cold condition, and together with the function of wedge component 824 as described below maintains axial alignment of nozzle tip 240 with its mold gate under operating conditions after thermal expansion of injection manifold assembly 802. Conversely components 240, 242 of nozzle seal 244 and injection manifold 860 may experience some misalignment between melt outlets 829 of injection manifold 860 and melt inlets 241a of nozzle tips 240 in a cold condition. However as injection manifold assembly 802 is heated to an operating temperature, the upstream surfaces 241, 243 of nozzle tip 240 and gate seal 242, respectively, are slidable along planar side surface 898 of injection manifold 860 during thermal expansion of the components to substantially eliminate under operating conditions any misalignment between each melt outlet 829 and its respective nozzle tip melt inlet 241a. Accordingly when used in linearly arranged edge-gated molding applications in accordance with embodiments hereof, the slidable interface between melt inlets of nozzle seals 244 and melt outlets of injection manifold assembly 802 permits thermal expansion of the injection manifold assembly with respect to the nozzle seals in both longitudinal and transverse directions without damaging the nozzle seals or adversely affecting alignment between the nozzle seals and their respective mold cavities.

Injection manifold assembly 802 may be used with injection molding apparatus 100, which is described with reference to FIG. 1, with some adaptation in place of injection manifold assembly 102. For such an installation, injection manifold 860 has a downstream connector component 386 of telescopic connector 380 threadably secured within an upstream end 803 thereof so as to be slidably connectable to upstream connector component 384 of telescopic connector 380, which is attached to downstream end 338 of injection molding nozzle 108 as described with reference to FIGS. 1, 3 and 3A. With injection manifold assembly 802 so installed in injection molding apparatus 100, a melt inlet at upstream end 803 of injection manifold 860 is positioned to receive a melt stream of moldable material from nozzle 108 and to fluidly communicate the melt stream to melt channels 832, 832' and subsequently through melt outlets 829 to nozzle seal 244.

Similar to the previous embodiments, a plurality of wedge components 824 may be used to apply a preload to an opposing pair of nozzle seals 244 that are associated therewith. Each wedge component 824 has a trapezoidal cross-section that is sized to be received within trapezoidal cross-sectioned portion 890b of keyed opening 890 and to be secured therein by a respective cap screw 819. Cap screws 819 are threadably engageable within a corresponding threaded bore of a rod 896 that is disposed to extend within circular cross-sectioned portion 890a of keyed opening 890 between opposing ends 817, 817' of injection manifold 860.

Wedge component 824 has opposing side contact surfaces 849a, 849b that are angled toward each other in a similar manner as described above with reference to wedge component 224, with each injection manifold finger portion 894 having a corresponding inside surface 815b that is angled to abut against a respective side contact surface 849a, 849b of wedge component 824. Accordingly, the torqueing of cap screw 819 within a wedge component 824 will bias an opposing pair of injection manifold finger portions 894 and associated nozzle seals 244 outward from a centerline $C_L$ of the injection manifold 860 toward their respective mold cavities (not shown) thereby applying a preload to each of the nozzle seals 244 that prevents leakage at the interface between each finger portion 894 and its associated nozzle seal 244 under operating conditions. This configuration permits an operator to apply any required preload from the parting line $P_L$ of the mold after assembly of the injection molding apparatus.

Figure 10A:
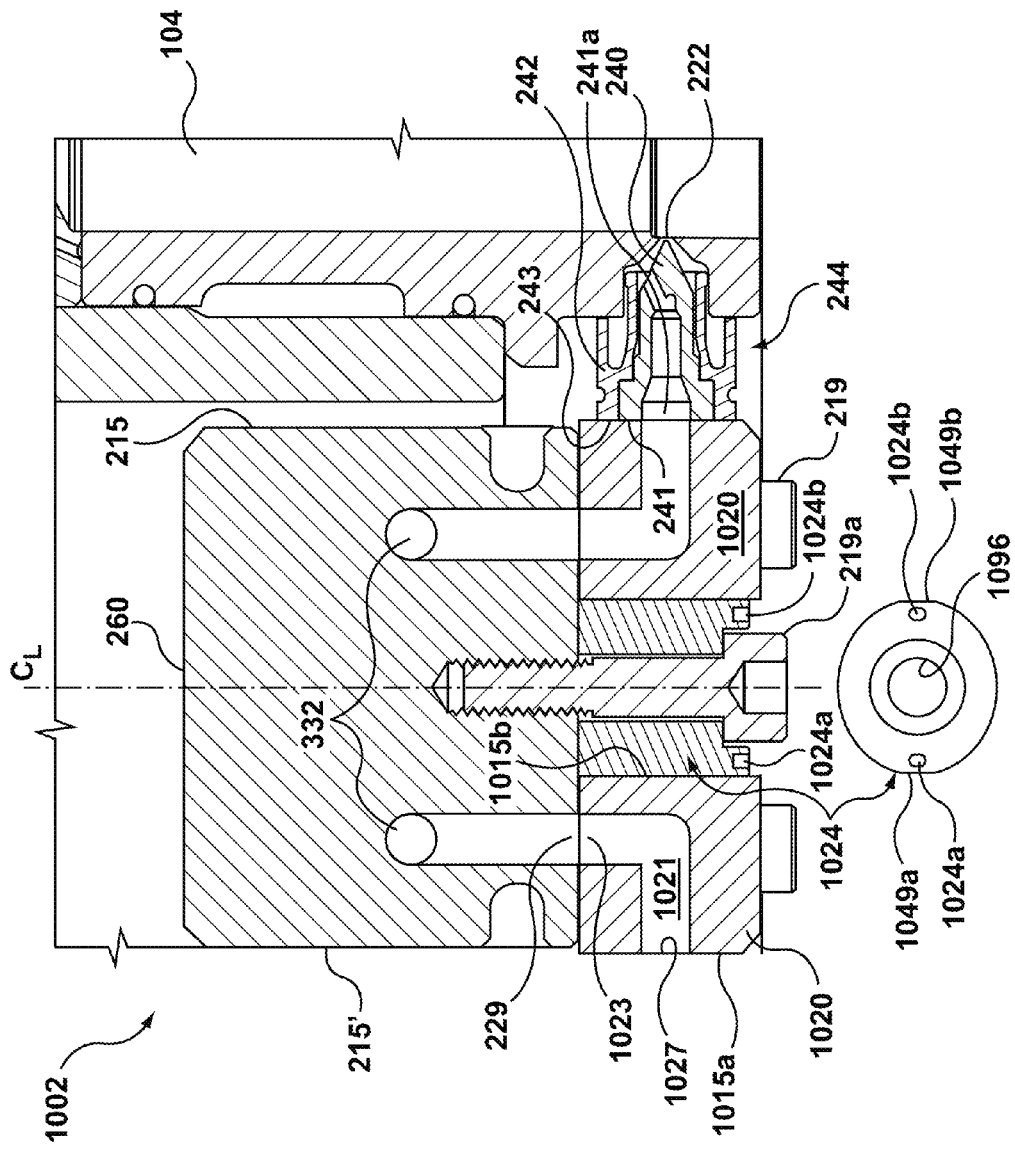
FIGS. 10A and 10B are sectional views of an injection manifold assembly in accordance with another embodiment hereof.
Figure 10B:
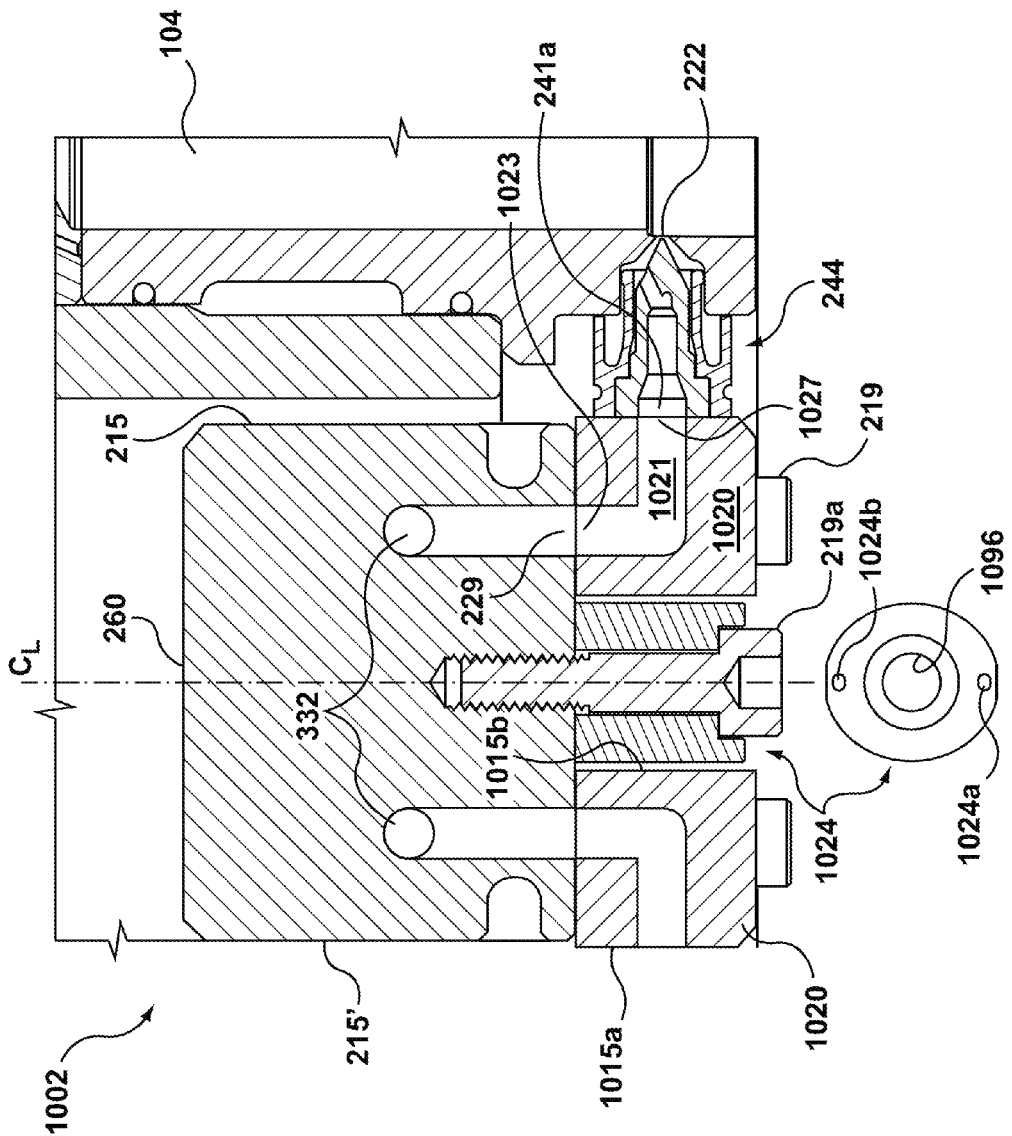

FIGS. 10A and 10B are sectional views of an edge-gated injection manifold assembly 1002 in accordance with another embodiment hereof. FIGS. 10A and 10B depict injection manifold assembly 1002 for distributing a melt stream of moldable material to a plurality of mold cavities aligned on opposing sides of the injection manifold assembly in accordance with another embodiment hereof that may be used with all features described with reference to other embodiments hereof such that only features that differ from those already described will be detailed herein. Injection manifold assembly 1002 includes injection manifold 260 as described above.

Melt channel 332 of injection manifold 260 receives a melt stream of moldable material, as described above, and distributes the melt stream via a plurality of melt outlets 229 to a plurality of diverter blocks 1020, each of which directs the melt stream to a pair of opposing cavity inserts 104. Each diverter block 1020 includes a melt inlet 1023 and a melt outlet 1027 with a melt channel 1021 extending between each inlet and outlet. Each diverter block 1020 is individually coupled to the downstream surface of injection manifold 260 by cap screw 219, such that each diverter block melt inlet 1023 is aligned with a respective injection manifold melt outlet 229. Dowels (not shown) may also be used between injection manifold 260 and diverter blocks 1020 to aid in aligning melt outlets 229 and with a corresponding melt inlet 1023 during assembly as well as to maintain alignment therebetween during thermal expansion that occurs as the system is brought to an operating temperature.

Outside surfaces 1015a of each diverter block 1020, include a respective diverter block melt outlet 1027, are substantially flush with respective opposing side surface 215, 215' of injection manifold 260. In the embodiment shown in FIGS. 10A and 10B, each diverter block melt channel 1021 includes a substantially 90° bend for directing the melt stream received through its respective diverter block melt inlet 1023 in an upstream surface thereof to its respective diverter block melt outlet 1027 in side surface 1015a thereof.

A series of biasing or cam components 1024 are coupled along substantially a centerline $C_L$ of the downstream surface of injection manifold 260 by respective cap screws 219a, each of which passes through a central bore 1096 of a respective cam component 1024. Each cam component 1024 is disposed between a pair of diverter blocks 1020. Cam component 1024 has a flattened oval cross-section with opposing side contact surfaces 1049a, 1049b. Diverter blocks 1020 are cube shaped and include an inside surface 1015b that abuts against a corresponding side contact surface 1049a, 1049b of a respective cam component 1024, when cam component 1024 is rotated to be in a locked position as shown in FIG. 10A. In the locked position of FIG. 10A, cam component 1024 biases an opposing pair of diverter blocks 1020 and associated nozzle seals 244 outward from centerline $C_L$ of injection manifold assembly 1002 toward their respective mold cavities thereby applying a preload to each of the nozzle seals 244 that prevents leakage at the interface between each diverter block 1020 and its associated nozzle seal 244 under operating conditions. Due to the shape of cam component 1024, cam components 1024 will remain in the locked position shown in FIG. 10A even if cap screw 219a inadvertently comes loose during the injection molding process. In this embodiment, the preload that is applied by locking cam component 1024 in place is a fixed preload that is determined by a distance between opposing side contact surfaces 1049a, 1049b.

FIG. 10B shows cam component 1024 in an unlocked position with side contact surfaces 1049a, 1049b of cam component 1024 out of engagement with the inside surfaces 1015b of diverter blocks 1020 such that no biasing force acts on diverter blocks 1020 and access to a respective nozzle seal 244 may occur by simply removing a respective cap screw 219 and the associated diverter block 1020. Once assembled or reassembled as shown in FIG. 10B, a tool may be used to engage apertures 1024a, 1024b of cam component 1024 to rotate the cam component into the locked position shown in FIG. 10A. Accordingly, this embodiment also permits an operator to more conveniently apply the preload from the parting line $P_L$ of the mold after the remainder of injection molding apparatus 100 is already assembled. In an embodiment, the injection molding system may be brought to an operating temperature and thereafter a preload may be applied, as discussed above, to prevent scoring that otherwise may have occurred if the preload were applied prior to heating-up the system. With this configuration nozzle seals 244, diverter blocks 1020, and cam components 1024 may be assembled and disassembled from a parting line $P_L$ of the mold.

Under operating conditions when injection manifold assembly 1002 undergoes thermal expansion, a respective inside surfaces 1015b of each diverter block 1020 will bear against a corresponding side contact surface 1049a, 1049b of cam component 1024 to assure that thermal expansion of diverter blocks 1020 occurs in the direction of the aforementioned interfaces. In embodiments hereof, accessibility of cam component 1024 from the parting line $P_L$ of the mold permits a sealing force between sealing interfaces of each diverter block to be adjusted from parting line $P_L$ by utilizing a replacement cam component having a greater or lesser width between side contact surfaces 1049a and 1049b than cam component 1024 as the case may warrant and thereby prevent an excessive load on the components of the system, for instance, if a low pressure application is used or to assure an adequate preload, for instance, if the preload provided by the original cam component 1024 were found to be insufficient.

Nozzle seals 244 are positioned to receive the melt stream from a respective melt outlet 1027 of diverter block 1020 and direct the melt stream into a respective mold cavity in fluid communication therewith. An upstream surface 243 of gate seal 242 and an upstream surface 241 of nozzle tip 240 are slidably disposed against a respective side surface 1015a of diverter block 1020, with each nozzle seal 244 otherwise not being directly attached or secured thereto. Accordingly, nozzle seal 244 functions to accommodate thermal expansion of the components of edge-gated injection manifold assembly 1002 as previously described above with reference to the previous embodiments.

Injection manifolds in accordance with embodiments hereof may be formed from H13. Diverter blocks in accordance with embodiments hereof may be formed from a thermally conductive material having sufficient strength for injection molding applications in which they are to be utilized, such as a high strength copper alloy or the like.

If a melt imbalance is discovered between melt cavities fed by a particular injection manifold assembly according to an embodiment hereof, a melt imbalance between mold cavities may be addressed by selecting one or more diverter blocks (one or all of them) of different materials. More particularly, as appropriate, one or more diverter blocks may be formed from a more thermally conductive material than other of the diverter blocks in order to draw more heat from the injection manifold and in turn to reduce the viscosity of the molding material flowing through that diverter block so as to promote increased flow and therefore faster filling of its associated mold cavity. Conversely a less thermally conductive diverter block may be used in embodiments hereof to restrict heat transfer from the injection manifold which would in turn increase the viscosity of the molding material flowing through that diverter block so as to reduce flow and therefore slow filling of its associated mold cavity. In this manner by selecting a diverter block with an appropriate thermal conductivity for each melt outlet of an injection manifold, melt flow may be balanced between the associated melt cavities for a particular injection manifold. For instance, at outlets positioned in a midsection of the injection manifold, which may be hotter, less thermally conductive diverter blocks may be used, and at outlets near the ends of the injection manifold, which may be less hot, more thermally conductive diverter blocks may be used. In embodiments hereof, diverter blocks having different thermal conductivities may be of different high strength copper alloys, such as of Ampco 940 with a thermal conductivity of 208 w/mk and of Ampco 944 with thermal conductivity of 156 w/mk. In another embodiment in order to balance melt flow, each diverter block may be separately heated to control the viscosity of the molding material flowing through that block.

In another embodiment in order to correct an imbalance between the mold cavities that are fed by a respective injection manifold assembly, melt channels extending through the diverter blocks may be selected or altered to have different widths and/or lengths there between to effect a respective melt flow rate and/or volume there through. For instance, a width of a melt channel of a diverter block may be selected or made wider to promote increased melt flow through the respective diverter block and therefore faster filling of the associated mold cavity, or may be selected or made narrower to provide a more restricted flow through the respective diverter block and therefore slower filling of the associated mold cavity.

In any of the embodiments described above, a copper plate may be disposed across a top or upstream surface of the injection manifold to evenly distribute heat.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An edge-gated injection molding apparatus comprising:
an injection manifold assembly for distributing a melt stream of moldable material to a plurality of mold cavities that are aligned on opposing sides of the injection manifold assembly, the injection manifold assembly having
exterior side surfaces including a plurality of melt outlets with each melt outlet being in fluid communication with a respective mold cavity of the plurality of mold cavities, and
a plurality of biasing components secured to the injection manifold assembly and being disposed for biasing the exterior side surfaces having the plurality of melt outlets outward from a centerline of the injection manifold assembly toward their respective mold cavities; and a plurality of nozzle seals for receiving the melt stream from the plurality of melt outlets of the injection manifold assembly and for delivering the melt stream to the plurality of mold cavities, wherein an upstream end of each nozzle seal is in fluid communication with a respective melt outlet and is slidably disposed against a respective exterior side surface of the injection manifold assembly to accommodate thermal expansion of the injection manifold assembly, and wherein each nozzle seal is biased outward from the centerline of the injection manifold assembly by a respective biasing component such that the outward biasing applies a preload to the nozzle seal.

2. The edge-gated injection molding apparatus of claim 1, wherein the injection manifold assembly includes an injection manifold and a plurality of diverter blocks that are attached to a downstream surface of the injection manifold.

3. The edge-gated injection molding apparatus of claim 2, wherein each of the plurality of diverter blocks defines one of the plurality of melt outlets of the injection manifold assembly and a respective exterior side surface of the injection manifold assembly against which a respective nozzle seal is slidably disposed and includes an interior side surface that contacts a corresponding surface of the biasing component associated with the melt outlet.

4. The edge-gated injection molding apparatus of claim 2, wherein the injection manifold includes a melt inlet in an upstream surface that is in fluid communication with a melt channel formed therein for receiving the melt stream of moldable material and distributing the melt stream via a plurality of melt outlets in the downstream surface thereof to the plurality of diverter blocks attached thereto.

5. The edge-gated injection molding apparatus of claim 4, wherein each diverter block includes a melt inlet and a melt outlet with a melt channel extending therebetween with the melt outlet of each diverter block defining one of the plurality of melt outlets of the injection manifold assembly and with an exterior side surface of each diverter block defining a respective exterior side surface of the injection manifold assembly against which a respective nozzle seal is slidably disposed.

6. The edge-gated injection molding apparatus of claim 5, wherein the melt channel of each diverter block includes a bend for directing the melt stream received through the melt inlet in an upstream surface thereof to the melt outlet in the exterior side surface thereof.

7. The edge-gated injection molding apparatus of claim 5, wherein each diverter block includes an interior side surface that contacts a corresponding contact surface of the biasing component associated with the melt outlet defined by the diverter block.

8. The edge-gated injection molding apparatus of claim 7, wherein the biasing component is a wedge component and the interior side surface of the diverter block is angled to abut against the corresponding contact surface of the wedge component.

9. The edge-gated injection molding apparatus of claim 7, wherein the biasing component is a rotatable cam component having a locked position in which a contact surface of the cam component abuts against the interior side surface of the diverter block.

10. An edge-gated injection molding apparatus comprising:
an injection manifold assembly for distributing a melt stream of moldable material to a plurality of mold cavities that are aligned on opposing sides of the injection manifold assembly, the injection manifold assembly having
an injection manifold with a downstream surface including a plurality of melt outlets
a plurality of diverter blocks that are attached to the downstream surface of the injection manifold, wherein each diverter block is attached to the downstream surface of the injection manifold to be positioned such that a melt inlet of the diverter block is aligned with a respective melt outlet in the downstream surface of the injection manifold and a melt outlet in an exterior side surface of the diverter block defines one of a plurality of melt outlets of the injection manifold assembly, and
a plurality of biasing components secured to the downstream surface of the injection manifold with each biasing component being disposed between a pair of diverter blocks; and
a plurality of nozzle seals for receiving the melt stream from the plurality of melt outlets of the injection manifold assembly and for delivering the melt stream to the plurality of mold cavities,
wherein an upstream end of each nozzle seal is in fluid communication with a respective melt outlet of a respective diverter block and is slidably disposed against a respective exterior side surface of the respective diverter block to accommodate thermal expansion of the injection manifold assembly and
wherein the respective biasing component associated with the respective diverter block biases the nozzle seal associated therewith outward from a centerline of the injection manifold assembly toward its respective mold cavity, such that the outward biasing applies a preload to the nozzle seal.

11. The edge-gated injection molding apparatus of claim 10, wherein the exterior side surface of each diverter block that includes the melt outlet is parallel with a respective side surface of the injection manifold.

12. The edge-gated injection molding apparatus of claim 10, wherein the exterior side surface of each diverter block that includes the melt outlet is at an acute angle relative to a centerline of the injection manifold assembly such that the exterior side surface of each diverter block is angled relative to a respective side surface of the injection manifold.

13. The edge-gated injection molding apparatus of claim 10, wherein the injection manifold is T-shaped.

14. An edge-gated injection molding apparatus comprising:
an injection manifold assembly for distributing a melt stream of moldable material to a plurality of mold cavities that are aligned on opposing sides of the injection manifold assembly, the injection manifold assembly having
a plurality of melt outlets with each melt outlet being in fluid communication with a respective mold cavity of the plurality of mold cavities, wherein the injection manifold assembly includes an injection manifold having a keyed opening and a plurality slots that define two rows of finger portions and wherein each finger portion includes one of the plurality of melt outlets of the injection manifold assembly, and
a plurality of biasing components secured to the injection manifold assembly with each biasing component being disposed between a pair of finger portions for biasing the melt outlets associated with the pair of finger portions outward from a centerline of the injection manifold assembly toward its respective mold cavity; and a plurality of nozzle seals for receiving the melt stream from the plurality of melt outlets and for delivering the melt stream to the plurality of mold cavities, wherein an upstream end of each nozzle seal is slidably disposed against a respective finger portion of the injection manifold such that the outward biasing of the melt outlet of the respective finger portion by its respective biasing component applies a preload to the nozzle seal.

15. The edge-gated injection molding apparatus of claim 14, wherein the plurality of biasing components are a plurality of wedge components with each wedge component being disposed within a portion of the keyed opening between the rows of finger portions to contact the pair of finger portions.

16. The edge-gated injection molding apparatus of claim 15, wherein each wedge component has opposing side contact surfaces that are angled toward each other with each injection manifold finger portion having a corresponding interior surface that is angled to abut against a respective side contact surface of the wedge component.

17. The edge-gated injection molding apparatus of claim 15, wherein each wedge component has a trapezoidal cross-section that is sized to be received within a correspondingly shaped portion of the keyed opening to be secured therein.

18. The edge-gated injection molding apparatus of claim 14, wherein the injection manifold includes a melt channel with each finger portion including a segment of the melt channel formed therein for receiving the melt stream and distributing the melt stream to the melt outlet thereof.

19. The edge-gated injection molding apparatus of claim 18, wherein each of the melt outlets is formed through a respective outward facing side surface of the finger portion.

20. The edge-gated injection molding apparatus of claim 1, wherein a downstream end of each nozzle seal is received within a bore that surrounds a mold gate of the respective mold cavity associated therewith.

* * * * *